US012802484B2

(12) United States Patent
Pak et al.

(10) Patent No.: US 12,802,484 B2
(45) Date of Patent: Nov. 17, 2026

(54) METHOD FOR PHOTOGRAPHING OBJECT FOR IDENTIFYING COMPANION ANIMAL, AND ELECTRONIC DEVICE

(71) Applicant: PETNOW INC., Daejeon (KR)

(72) Inventors: Dae Hyun Pak, Seoul (KR); Joon Ho Lim, Seoul (KR)

(73) Assignee: PETNOW INC., Daejeon (KR)

( * ) Notice: Subject to any disclaimer, the term of this patent is extended or adjusted under 35 U.S.C. 154(b) by 241 days.

(21) Appl. No.: 18/288,809

(22) PCT Filed: Jun. 27, 2022

(86) PCT No.: PCT/KR2022/009095

§ 371 (c)(1),
(2) Date: Oct. 28, 2023

(87) PCT Pub. No.: WO2023/277473

PCT Pub. Date: Jan. 5, 2023

(65) Prior Publication Data

US 2024/0221416 A1 Jul. 4, 2024

(30) Foreign Application Priority Data

Jun. 28, 2021 (KR) ........................ 10-2021-0083753
Jun. 28, 2021 (KR) ........................ 10-2021-0083754
Jun. 28, 2021 (KR) ........................ 10-2021-0083841

(51) Int. Cl.
*G06V 40/10* (2022.01)
*G06V 10/22* (2022.01)
(Continued)

(52) U.S. Cl.
CPC ............ *G06V 40/10* (2022.01); *G06V 10/225* (2022.01); *G06V 10/44* (2022.01); *G06V 10/82* (2022.01); *G06V 10/95* (2022.01)

(58) Field of Classification Search
CPC ...... G06V 40/10; G06V 10/225; G06V 10/44; G06V 10/82; G06V 10/95; G06V 10/22;
(Continued)

(56) References Cited

U.S. PATENT DOCUMENTS 11,188,734 B2 11/2021 Mather et al.
11,263,444 B2 * 3/2022 Datta .................... G06T 7/0016
(Continued)

FOREIGN PATENT DOCUMENTS

JP 2001-202516 7/2001
JP 2019-10004 1/2019
(Continued)

OTHER PUBLICATIONS

Office Action from the Canadian Intellectual Property Office dated Dec. 12, 2024.
(Continued)

*Primary Examiner* — Emily C Terrell
*Assistant Examiner* — Ahmed A Nasher

(57) ABSTRACT

The present invention provides an image processing method and an electronic device capable of effectively detecting an object for identifying a companion animal while reducing computational complexity. According to the present invention, a method for detecting an object for identifying a companion animal includes acquiring an original image including the companion animal, determining a first feature region and a species of the companion animal by image processing on the original image, and detecting the object for identifying the companion animal within the first feature region based on the determined species of the companion animal.

20 Claims, 13 Drawing Sheets

(a) (b)

(51) Int. Cl.

| | |
|---|---|
| ***G06V 10/44*** | (2022.01) |
| ***G06V 10/82*** | (2022.01) |
| ***G06V 10/94*** | (2022.01) |

(58) Field of Classification Search

CPC ...... G06V 10/25; G06V 10/32; G06V 10/764; G06V 40/161; G06V 40/171; G06N 3/08; G06N 3/04

See application file for complete search history.

(56) References Cited

U.S. PATENT DOCUMENTS

| | | | | |
|---|---|---|---|---|
| 2019/0064929 | A1* | 2/2019 | Tomeh | H04L 67/535 |
| 2021/0068371 | A1* | 3/2021 | Chen | A01K 11/006 |
| 2021/0089763 | A1* | 3/2021 | Shamsi | G06V 10/54 |
| 2021/0306586 | A1* | 9/2021 | Yamamoto | H04N 23/80 |
| 2022/0036054 | A1* | 2/2022 | Kim | G06V 10/40 |

FOREIGN PATENT DOCUMENTS

| | | | | |
|---|---|---|---|---|
| JP | 2020-074174 | | 5/2020 | |
| KR | 10-2016-0119932 | | 10/2016 | |
| KR | 10-2020-0044209 | | 4/2020 | |
| KR | 10-2020-014193 | | 12/2020 | |
| KR | 10-2020-0143193 | | 12/2020 | |
| KR | 10-2021-0006627 | | 1/2021 | |
| TW | M598479 | | 7/2020 | |
| WO | WO-2020075888 | A1 * | 4/2020 | G06N 3/08 |
| WO | WO-2022077113 | A1 * | 4/2022 | G06V 30/147 |

OTHER PUBLICATIONS

Office Action from the Japan Patent Office dated Oct. 22, 2024.

EPO Search Report date on Feb. 17, 2025.

Kenneth Lai et al: "Dog Identification using Soft Biometrics and Neural Networks", arxiv.org, 201 Olin Library Cornell University Ithaca, NY 14853, Jul. 22, 2020 (Jul. 22, 2020), XP081726186, DOI: 10.1109/IJCNN.2019.8851971.

Kumar Santosh et al: "Monitoring of pet animal in smart cities using animal biometrics", Future Generation Computer Systems, Elsevier Science Publishers. Amsterdam, NL, vol. 83, Dec. 14, 2016 (Dec. 14, 2016), pp. 553-563, XP085360530, ISSN: 0167-739X, DOI: 10.1016/J.FUTURE.2016.12.006.

Office Action from the Korean Intellectual Property Office dated Oct. 18, 2021.

PCT ISR dated Oct. 7, 2022.

* cited by examiner (a) (b) (c)

METHOD FOR PHOTOGRAPHING OBJECT FOR IDENTIFYING COMPANION ANIMAL, AND ELECTRONIC DEVICE

TECHNICAL FIELD

The present invention relates to a method and an electronic device for capturing an image of an object for identifying a companion animal, and more particularly, to a method and an electronic device for acquiring an image of an object for identifying of a companion animal, which is suitable for artificial intelligence-based learning or identification.

BACKGROUND ART

In modern society, there is an increasing demand for companion animals that can emotionally support people while living with people. Accordingly, there is an increasing need to manage information on various companion animals in a database for health management of the companion animals. To manage the companion animal, identification information of the companion animal such as a human fingerprint is required, and available objects may be defined in accordance with the companion animals. For example, in the case of dogs, noseprint (the shape of the nose folds) are individually unique. Thus, the noseprint can be used as identification information for each dog.

As illustrated in (a) of FIG. 1, a method of registering a noseprint is performed in a manner that an image of a face including the nose of a companion animal is captured (S110), and the image including the noseprint is stored and registered in a database (S120), as with a method of registering a fingerprint or face of a person. In addition, a method of inquiring the noseprint is performed in a manner that an image of the noseprint of the companion animal is captured (S130), a noseprint coinciding with the captured noseprint and information related to the captured noseprint is searched for (S140), and then information coinciding with the captured noseprint is output (S150), as illustrated in (b) of FIG. 1. By registering and inquiring the noseprint of a companion animal as illustrated in FIG. 1, it is possible to identify each companion animal and manage information on the corresponding companion animal. Noseprint information of the companion animal may be stored in a database and be used as data for AI-based learning or identification.

However, there are some problems in acquiring and storing the noseprint of companion animals.

First, regarding an image, recognition may have difficulty depending on an image capturing angle, a focus, a distance, a size, an environment, and the like. There have been attempts to apply a human facial recognition technique to noseprint recognition, but there is a problem that sufficient pieces of human facial information are accumulated, whereas sufficient pieces of noseprint information of companion animals are not secured, resulting in a low recognition rate. Specifically, in order to perform AI-based recognition, learning data processed in a form of being allowed to be learned by a machine is required. However, sufficient pieces of noseprint information of companion animals are not secured, and thus noseprint recognition has difficulty.

In addition, an image with clear noseprint is required for noseprint recognition of companion animals, but unlike humans, companion animals do not know how to perform actions such as stopping for a moment, so it is not easy to acquire a clear image of noseprint. For example, it is very difficult to acquire an image of a noseprint with desired quality because a dog constantly moves the face and sticks out the tongue. For example, an image in which the wrinkles of the nose clearly appear is required for noseprint recognition, but, in most of the actually captured images, the noseprint does not clearly appear due to shaking and the like in many cases. In order to solve a problem, a method of capturing an image with the nose of the dog forcibly fixed is being considered, but this method is evaluated as being inappropriate because the action of the companion animal is forcibly performed.

DISCLOSURE

Technical Problem

The present invention provides an image processing method and an electronic device capable of effectively detecting an object for identifying a companion animal while reducing computational complexity.

The present invention provides a method and an electronic device capable of effectively filtering a low-quality image in a process of acquiring an image of an object for identifying a companion animal.

The problems to be solved of the present invention are not limited to those mentioned above, and other problems not mentioned will be clearly understood by those skilled in the art from the following description.

Technical Solution

According to the present invention, a method for detecting an object for identifying a companion animal includes acquiring an original image including the companion animal, determining a first feature region and a species of the companion animal by image processing on the original image, and detecting the object for identifying the companion animal within the first feature region based on the determined species of the companion animal.

According to the present invention, determining the species of the companion animal may include applying first pre-processing to the original image, determining the species of the companion animal from the pre-processed image and setting the first feature region, and extracting a first feature value by first post-processing on the first feature region.

According to the present invention, setting the first feature region may include generating a plurality of feature images from the pre-processed image by using a learning neural network, applying a bounding box defined in advance to each of the plurality of feature images, calculating a probability value for each type of companion animal within the bounding box, and forming the first feature region to include the bounding box when the calculated probability value for a specific animal species is equal to or greater than a reference value.

According to the present invention, the object for identifying the companion animal may be detected when the first feature value is greater than a reference value, and additional processing may be omitted when the first feature value is smaller than the reference value.

According to the present invention, applying the first pre-processing to the original image may include converting the original image into an image having a first resolution lower than an original resolution, and applying the first pre-processing to the image converted to the first resolution.

According to the present invention, detecting the object for identifying the companion animal may include applying second pre-processing to the first feature region for identifying the species of the companion animal, setting a second feature region for identifying the companion animal based on the species of the companion animal in the first feature region subjected to the second pre-processing, and extracting a second feature value by applying second post-processing to the second feature region.

According to the present invention, the second pre-processing on the first feature region may be performed at a second resolution higher than a first resolution at which the first pre-processing for setting the first feature region is applied.

According to the present invention, setting the second feature region may include setting the second feature region based on a probability that the object for identifying the companion animal is located in the first feature region in accordance with the species of the companion animal.

According to the present invention, when the second feature value is greater than a reference value, an image including the second feature region may be transmitted to the server.

According to the present invention, generating the first feature region may include generating feature region candidates for determining the species of the companion animal from the image, and generating the first feature region having a location and a size that are determined based on a reliability value of each of the feature region candidates.

According to the present invention, an electronic device includes a camera that generates an original image including the companion animal, a processor that determines a first feature region and a species of the companion animal by image processing on the original image, and detects the object for identifying the companion animal within the first feature region based on the determined species of the companion animal, and a communication module that transmits an image of the object to a server when the object for identifying the companion animal is valid.

According to the present invention, the processor may apply first pre-processing to the original image, determine the species of the companion animal from the pre-processed image to set the first feature region, and extract a first feature value by first post-processing on the first feature region.

According to the present invention, the processor may generate a plurality of feature images from the pre-processed image by using a learning neural network, apply a bounding box defined in advance to each of the plurality of feature images, calculate a probability value for each type of companion animal within the bounding box, and form the first feature region to include the bounding box when the calculated probability value for a specific animal species is equal to or greater than a reference value.

According to the present invention, the object for identifying the companion animal may be detected when the first feature value is greater than a reference value, and additional processing may be omitted when the first feature value is smaller than the reference value.

According to the present invention, the processor may convert the original image into an image having a first resolution lower than an original resolution, and apply the first pre-processing to the image converted to the first resolution.

According to the present invention, the processor may apply second pre-processing to the first feature region for identifying the species of the companion animal, set a second feature region for identifying the companion animal based on the species of the companion animal in the first feature region subjected to the second pre-processing, and extract a second feature value by applying second post-processing to the second feature region.

According to the present invention, the second pre-processing on the first feature region may be performed at a second resolution higher than a first resolution at which the first pre-processing for setting the first feature region is applied.

According to the present invention, the processor may set the second feature region based on a probability that the object for identifying the companion animal is located in the first feature region in accordance with the species of the companion animal.

According to the present invention, when the second feature value is greater than a reference value, an image including the second feature region may be transmitted to the server.

According to the present invention, the processor may generate feature region candidates for determining the species of the companion animal from the image, and generate the first feature region having a location and a size that are determined based on a reliability value of each of the feature region candidates.

Advantageous Effects

According to the present invention, in the method and the electronic device for detecting an object for identifying a companion animal, an image for learning or identification of a noseprint is selected immediately after an image of a companion animal is captured, and then the selected image is stored in a database of a server. Thus, it is possible to effectively acquire an image of an object corresponding to a nose of the companion animal for learning or identification.

In addition, according to the present invention, in the method and the electronic device for detecting an object for identifying a companion animal, it is possible to reduce computational complexity by determining the species of the companion animal and then extracting a noseprint image of the companion animal.

According to the present invention, since, in the process of determining the feature region for determining the species of the companion animal, the final feature region of a wider region is generated in consideration of the reliability value of each of the plurality of feature region candidates, it is possible to perform more accurate detection by detecting the object for identifying the companion animal within the final feature region.

According to the present invention, by examining the quality of an image of an object for identifying a companion animal such as the nose of a dog in a captured image, it is possible to check whether the image is suitable for AI-based learning or identification, and to optimize a neural network for learning or identification by storing only the suitable image.

Effects of the present invention are not limited to those mentioned above, and other effects not mentioned will be clearly understood by those skilled in the art from the following description.

DESCRIPTION OF DRAWINGS

The above and other objectives, features, and other advantages of the present disclosure will be more clearly understood from the following detailed description taken in conjunction with the accompanying drawings, in which.

MODE FOR INVENTION

Hereinafter, an embodiment of the present invention will be described in detail with reference to the attached drawings to be easily implemented by those skilled in the art. The present invention may be implemented in various different forms and is not limited to the embodiments described herein.

In order to clearly describe the present invention, parts that are not related to the description will be omitted, and the same or similar components in this specification are denoted by the same reference sign.

In addition, in various embodiments, a component having the same configuration will be described only in a representative embodiment by using the same reference sign, and only a configuration that is different from that of the representative embodiment will be described in other embodiments.

In the entirety of this specification, a sentence that a portion is "connected (or coupled) to" another portion includes not only a case of "being directly connected (coupled)" but also a case of "being indirectly connected (coupled) with other members interposed therebetween". In addition, a sentence that a portion "includes" a component means that it may further include another component rather than excluding other components unless a particularly opposite statement is made.

Unless otherwise defined, all terms used herein, including technical or scientific terms, have the same meaning as generally understood by those skilled in the art. Terms such as those defined in a commonly used dictionary should be construed as having a meaning consistent with the meaning of the relevant technology, and should not be construed as an ideal or excessively formal meaning unless explicitly defined in this application.

In this document, the contents of extracting identification information by utilizing the shape of a dog noseprint (noseprint) are mainly described, but in the present invention, the scope of companion animals is not limited to dogs. In addition, various physical characteristics of companion animals may be used as a feature used as identification information, in addition to the noseprint.

As described above, since the noseprint images of companion animals suitable for AI-based learning or identification are not sufficient, and the noseprint images of companion animals are likely to be of low quality, it is necessary to selectively store the noseprint image for AI-based learning or identification, in the database.

Figure 1:
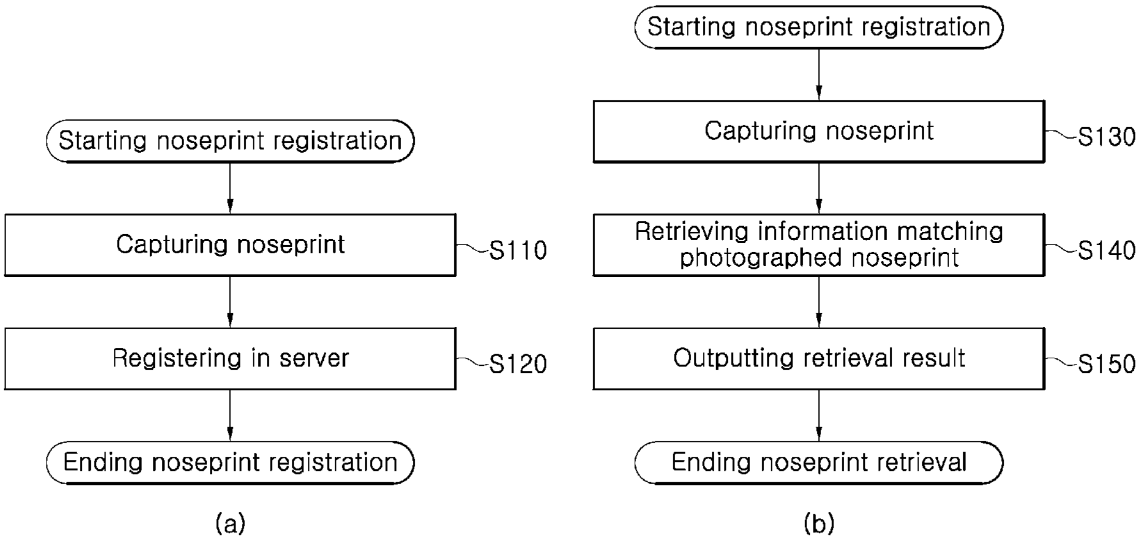
FIG. 1 illustrates a procedure for AI-based management of a companion animal.
Figure 2:
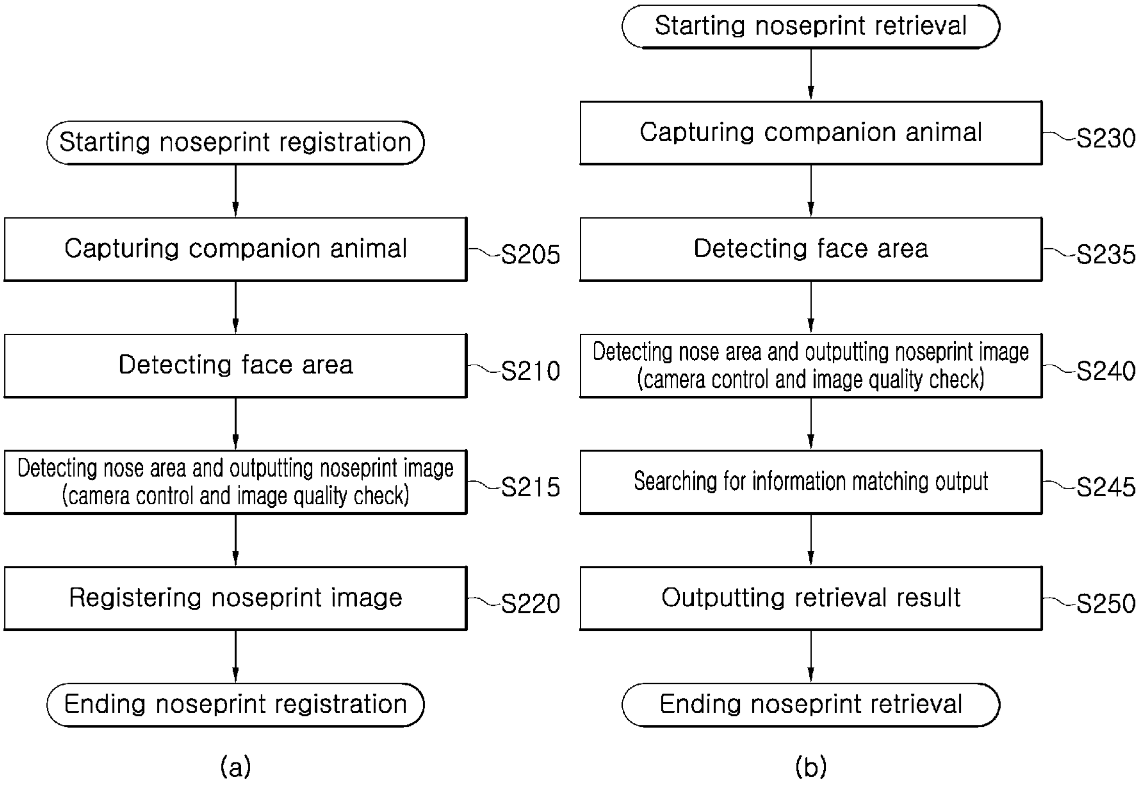
FIG. 2 illustrates a procedure for managing noseprint of a companion animal based on an AI in which suitability determination of an object image for learning or identification is applied, according to the present invention.

FIG. 2 illustrates a procedure for managing noseprint of a companion animal based on an AI in which suitability determination of an object image for learning or identification is applied, according to the present invention. In the present invention, an image of the noseprint of a companion animal is captured, and then it is determined whether or not the captured noseprint image is suitable as data for AI-based learning or identification. When it is determined that the captured image is suitable, the captured image is transmitted and stored to and in the server for AI-based learning or identification, and then is used as data for learning or identification.

As illustrated in FIG. 2, the noseprint management procedure according to the present invention roughly includes a noseprint acquisition procedure and a noseprint recognition procedure.

According to the present invention, when a new noseprint of a companion animal is registered, an image containing a companion animal is captured, and then a noseprint image is extracted from the face region of the companion animal. Then, it is determined whether or not, in particular, the noseprint image is suitable for identifying the companion animal or performing learning. When it is determined that the captured image is suitable for identification or learning, the image is transmitted to a server (artificial intelligence neural network) and stored in a database.

When identification information of a companion animal is inquired with noseprint, in the same manner, an image containing a companion animal is captured, then the noseprint image is extracted from the face region of the companion animal. Then, it is determined whether or not, in particular, the extracted noseprint image is suitable for identifying the companion animal or performing learning. When it is determined that the captured image is suitable for identification or learning, the captured image is transmitted to the server, and the identification information of the corresponding companion animal is extracted by matching with noseprint images stored previously.

In the case of the noseprint registration procedure, an image of a companion animal is captured (S205) as illustrated in (a) of FIG. 2. A face region (described as a first feature region below) is detected from the captured image of the companion animal (S210). A region (described as a second feature region below) occupied by the nose in the face region is detected and a noseprint image is output by a quality examination of whether the captured image is suitable for learning or identification (S215). Then, the output image is transmitted to the server constituting the artificial neural network, and stored and registered (S220).

In the case of the noseprint inquiry procedure, an image of a companion animal is captured (S230) as illustrated in (b) of FIG. 2. A face region is detected from the image of the companion animal (S235). A region occupied by the nose in the face region is detected and a noseprint image is output by a quality examination of whether the captured image is suitable for learning or identification (S240). Such a noseprint inquiry procedure is performed in the similar manner to the noseprint registration procedure. Then, a process of searching for coincidence information by comparing the output noseprint image to the noseprint images stored and learned previously (S245), and a process of outputting the search result (S250) are performed.

Figure 3:
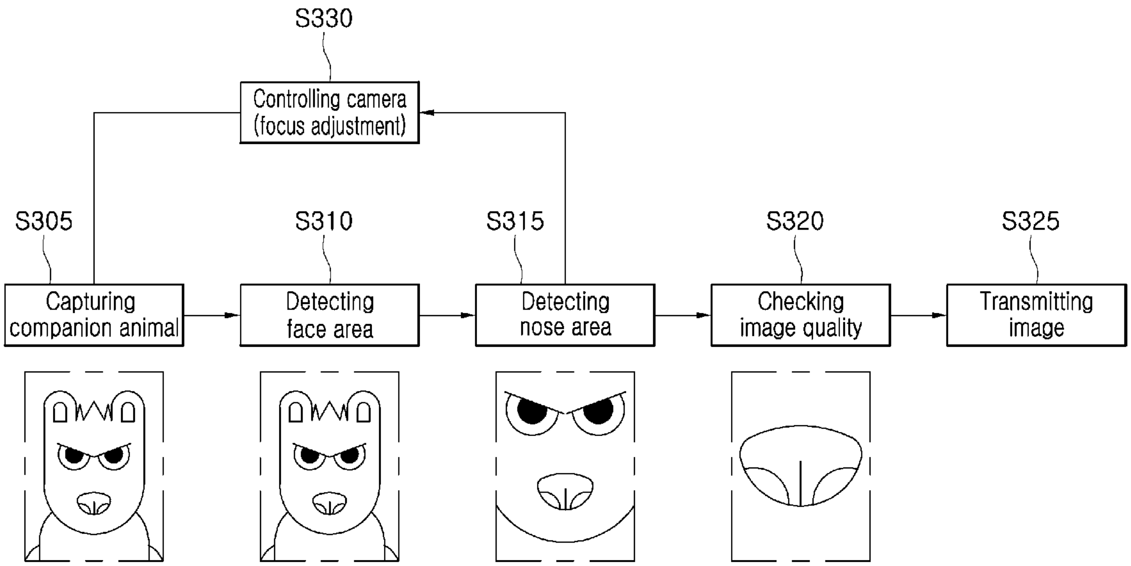
FIG. 3 illustrates a procedure for detecting an object for identifying a companion animal in a companion animal management system according to the present invention.

FIG. 3 illustrates a procedure for detecting an object corresponding to the nose of the companion animal in a noseprint management system of a companion animal according to the present invention.

With reference to FIG. 3, an initial image is generated by capturing an image of the companion animal (S305), and a step of detecting a face region from the initial image is performed (S310). Then, a step of detecting a nose region in consideration of the species of the companion animal within the face region is performed (S315). The reason of primary detection of the face region and secondary detection of the nose region is that it is possible to reduce computational complexity and improve detection accuracy by cascaded detection, as compared to a case where the nose region is detected in consideration of all species. Then, a quality examination for examining whether the image of the detected nose region is suitable for identification or learning of the noseprint in the future is performed (S320). When the image is determined to be suitable as a result of the quality examination, this image may be transmitted to the server to be used for identifying the noseprint or may be stored for learning or identification in the future (S325).

In addition, according to the present invention, the camera can be controlled to focus on the detected nose region so that the image of an object for identifying the companion animal, such as a noseprint of a dog, is not captured blurry (S330). This is to prevent deterioration of the image quality due to the nose being out of focus, by making the camera focus on the nose region.

Figure 4:
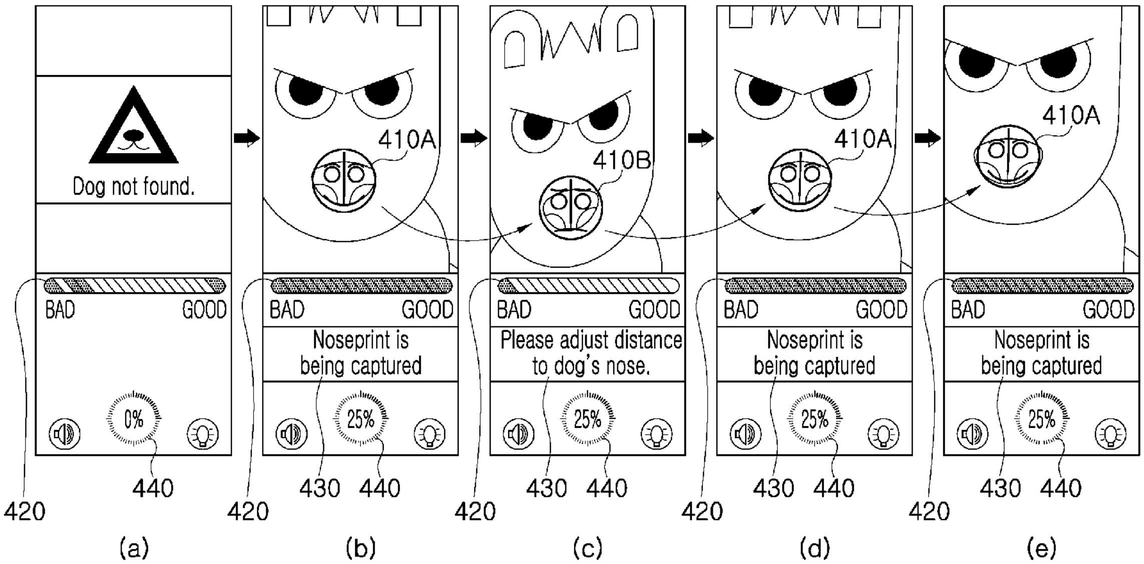
FIG. 4 illustrates an example of a user interface (UI) screen for detecting an identification object of a companion animal to which the present invention is applied.

FIG. 4 illustrates an example of a user interface (UI) screen for acquiring the noseprint image of a companion animal to which the present invention is applied. FIG. 4 illustrates a case of acquiring the noseprint of a dog among several companion animals.

With reference to FIG. 4, the species of a companion animal is identified from the captured image, and it is determined whether the companion animal during image capturing is a dog. When the companion animal during image capturing is not a dog, a phrase of, for example, “it is not possible to find a dog” is output as illustrated in (a) of FIG. 4. When the companion animal during image capturing is a dog, the procedure of acquiring the noseprint of the dog is performed. The face region of the companion animal included in the image may be first extracted in order to determine whether the companion animal during image capturing is a dog, and then the species of the companion animal may be determined by comparing the image included in the face region to the known learned data.

Then, as illustrated in (b) to (e) of FIG. 4, a region corresponding to the nose of the dog on the face of the dog may be set, and then image capturing may be performed focusing on the region corresponding to the nose. That is, the camera may be controlled to focus on a position (center point) of a region corresponding to an object for identifying the companion animal. In addition, a graphic element may be overlaid on the position of an object being tracked in order to give a user feedback that image capturing is performed focusing on the currently tracked object (for example, nose). By displaying a graphic element indicating the detection state of the object being tracked at the location of the object being tracked, the user may recognize that object recognition is performed on the companion animal currently during image capturing.

When the image quality of the object currently being captured is favorable (when the image quality of the object satisfies a reference condition) as illustrated in (b) to (e) of FIG. 4, a first graphic element 410A (for example, smiley icon or green icon) indicating the favorable image quality may be overlaid on the object and output. When the image quality of the object currently being captured is poor (when the image quality of the object does not satisfy the reference condition), a second graphic element 410B (for example, crying icon or red icon) indicating the poor quality state may be overlaid on the object and output.

Even when the dog is continuously moving as illustrated in FIG. 4, image capturing may be performed focusing on the nose while tracking the nose of the dog. In this case, it may be determined whether the noseprint image of the dog in each captured image is suitable for identification or learning of a companion animal, and the degree of suitability may be output.

For example, the degree of whether the captured noseprint image of the dog is suitable for identification or learning of a companion animal may be calculated as a numerical value. Score information 420 in a form of filling a gauge in accordance with the value of the suitability, for example, a form of filling a gauge in a “BAD” direction as the suitability becomes lower, and in a “GOOD” direction as the suitability becomes higher, may be output. That is, the score information 420 indicating the image capturing quality of the object in the image may be output.

In addition, the quality evaluation (size, brightness, sharpness, and the like) of the noseprint image being captured may be performed, and a message 430 for providing the user with feedback may be output so that the noseprint image suitable for AI-based identification or learning is captured. For example, when the size of the dog noseprint image is smaller than a reference value, a message such as “please adjust the distance to the nose of the dog” as illustrated in (c) of FIG. 4 may be output. In addition, progress rate information 440 indicating a progress degree of acquiring an image of the object having quality suitable for identifying a companion animal may be output. For example, when four noseprint images with suitable quality are required and one suitable image has been acquired so far, the progress information 440 indicating that the progress rate is 25% may be output as illustrated in FIG. 4.

When the noseprint image of the dog is sufficiently acquired, the image capturing may be ended, and identification information may be stored in the database together with the noseprint image of the dog, or the identification information of the dog may be output.

In the present invention, the face region of the companion animal is detected, and then the nose region is detected within the face region. This is to reduce the difficulty of object detection while reducing computational complexity. In the process of capturing an image, an object other than an object to be detected or unnecessary or erroneous information may be included in the image. Therefore, in the present invention, it is first determined whether a desired object (the nose of a companion animal) exists in the image being captured.

In addition, in order to identify the noseprint of the companion animal, an image having a resolution higher than a predetermined level is required, but there is a problem that, as the resolution of the image increases, the amount of computation for image processing increases. In addition, as the types of companion animals increase, there is a problem in that the computational difficulty of artificial intelligence further increases because a learning method is different for each type of companion animal. In particular, animals of a similar kind have similar shapes (for example, the nose of a dog is similar to the nose of a wolf). Thus, for similar animals, classifying the nose along with the animal type may have very high computational difficulty.

Thus, in the present invention, a cascaded object detection method is used to reduce the computational complexity. For example, the face region of a companion animal is detected while capturing an image of the companion animal. Then, the type of companion animal is identified, and the nose region of the companion animal is detected based on the detected face region of the companion animal and the identified type of companion animal. This means that the process of identifying the type of companion animal is performed at a low resolution with relatively low computational complexity, and then the nose region is detected while a high resolution is maintained in the face region of the companion animal, by applying an object detection method determined in accordance with the type of companion animal. Thus, according to the present invention, it is possible to effectively detect the nose region of a companion animal while relatively reducing computational complexity.

Figure 5:
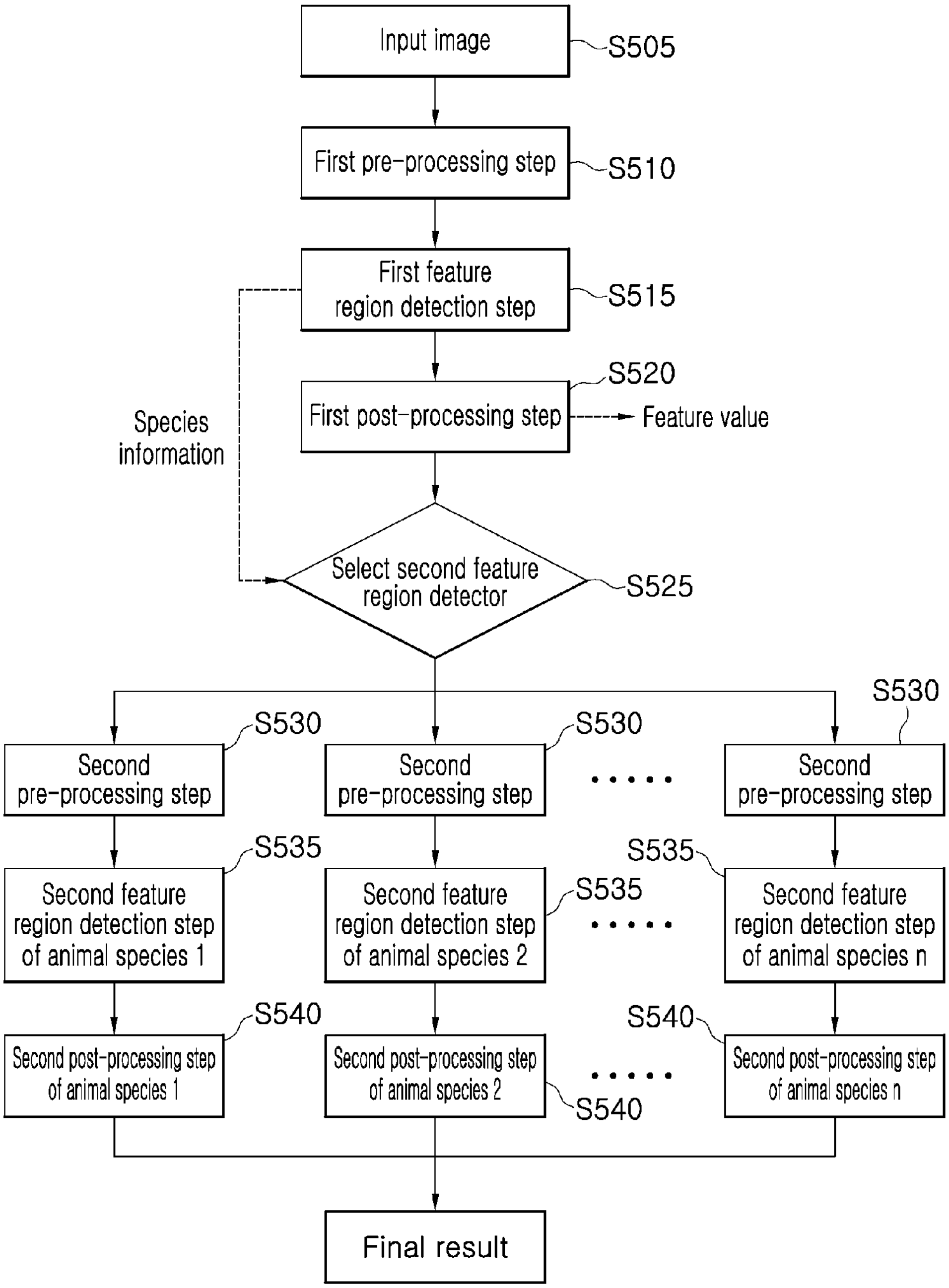
FIG. 5 illustrates a process of detecting an object for identifying a companion animal according to the present invention.

FIG. 5 illustrates an overall image processing step for identifying a companion animal according to the present invention. As illustrated in FIG. 5, according to the present invention, a method of processing an input image includes a step of receiving an input image from the camera (S505), a first pre-processing step of generating a primary processed image by adjusting the size of the input image (S510), a first feature region detection step of detecting the position of an animal and the type of animal from the processed image generated in the first pre-processing step (S515), a first post-processing step of extracting a first feature value of an animal image from the result in the first feature region detection step (S520), a step of determining a detector that detects an object (for example, nose) for identifying a companion animal, from the image processed in the first post-processing step, in accordance with the type of companion animal (S525), a second pre-processing step of adjusting the size of the image for image processing for identifying the companion animal (S530), at least a second feature region detection step corresponding to the type of animal detectable in the first feature detection step (S535), and a second post-processing step of extracting a second feature value of the animal image corresponding to each second feature region detection step (S540).

First Pre-Processing Step

The step of applying the first pre-processing to an original image (S510) is a step of converting the image into a form suitable for object detection by adjusting the size, the ratio, the direction, and the like of the original image.

With the development of the camera technique, an input image is mostly configured by millions to tens of millions of pixels, and it is not desirable to directly process such a large image. In order for object detection to be efficiently performed, it is necessary to perform a pre-processing process to make the input image suitable for processing. Such a process is mathematically performed as a coordinate system transformation.

It is clear that any processed image can be generated by matching any four points in the input image to the four vertices of the processed image and performing any coordinate system transformation process. However, when any nonlinear transformation function is used in the coordinate system transformation process, inverse transformation to obtain the feature region of the input image from a bounding box acquired as a result of a feature region detector is to be possible. For example, it is preferable to use an affine transformation, which linearly transforms four any points of an input image by matching the points of the input image with four vertices of the processed image, because the inverse transformation process can be easily obtained.

As an example of a method of determining four any points in the input image, a method of using four vertices of the input image as they are may be considered. Alternatively, a method of adding a blank space to the input image or cutting out a portion of the input image may be used so that the horizontal and vertical lengths are converted at the same ratio. Alternatively, various interpolation methods may be applied to reduce the size of the input image.

First Feature Region Detection Step

The purpose of this step is as follows. A region in which the companion animal exists and the species of the companion animal are detected from the pre-processed image, and a first feature region usable in the second feature region detection step described later is set. In addition, a second feature region detector optimized for the species of the companion animal is selected to improve the final feature point detection performance.

In this process, the object detection and classification method can be easily combined by those skilled in the related art. However, since the method based on the artificial neural network is known to have superior performance compared to the conventional method, it is preferable to use a feature detection technique based on the artificial neural network as much as possible. For example, a feature detector of a single-shot multibox detection (SSD) method, which is an algorithm for detecting objects having various sizes with respect to one image in the artificial neural network, may be used.

The input image normalized by a pre-processor described above is hierarchically configured from the first feature image to the n-th feature image by the artificial neural network. In this case, a method of extracting a feature image for each layer may be mechanically learned in a learning step of the artificial neural network.

The hierarchical feature image extracted in this manner is combined with a list of predefined boxes (priori box) corresponding to each layer to generate a list of bounding boxes, object types, and reliability values. Such a computational process may also be mechanically learned in the learning stage of the artificial neural network. For example, the result is returned in the format shown in Table 1 below. At this time, the number of species that can be determined by the neural network is determined in the neural network design step. When an object does not exist implicitly, that is, "background" is defined.

TABLE 1

| bounding box | probability of being background | probability of being species 1 | probability of being species 2 | . . . | probability of being species n |
|---|---|---|---|---|---|
| [0.2, 0.2]-[0.3, 0.3] | 0.95 | 0.01 | 0.02 | | 0.00 |

TABLE 1-continued

| bounding box | probability of being background | probability of being species 1 | probability of being species 2 | . . . | probability of being species n |
|---|---|---|---|---|---|
| [0.3, 0.3]-[0.4, 0.4] | 0.05 | 0.90 | 0.01 | | 0.00 |
| . . . | | | | | |
| [0.9, 0.9]-[1.0, 1.0] | 0.00 | 0.01 | 0.00 | | 0.99 |

Figure 6:
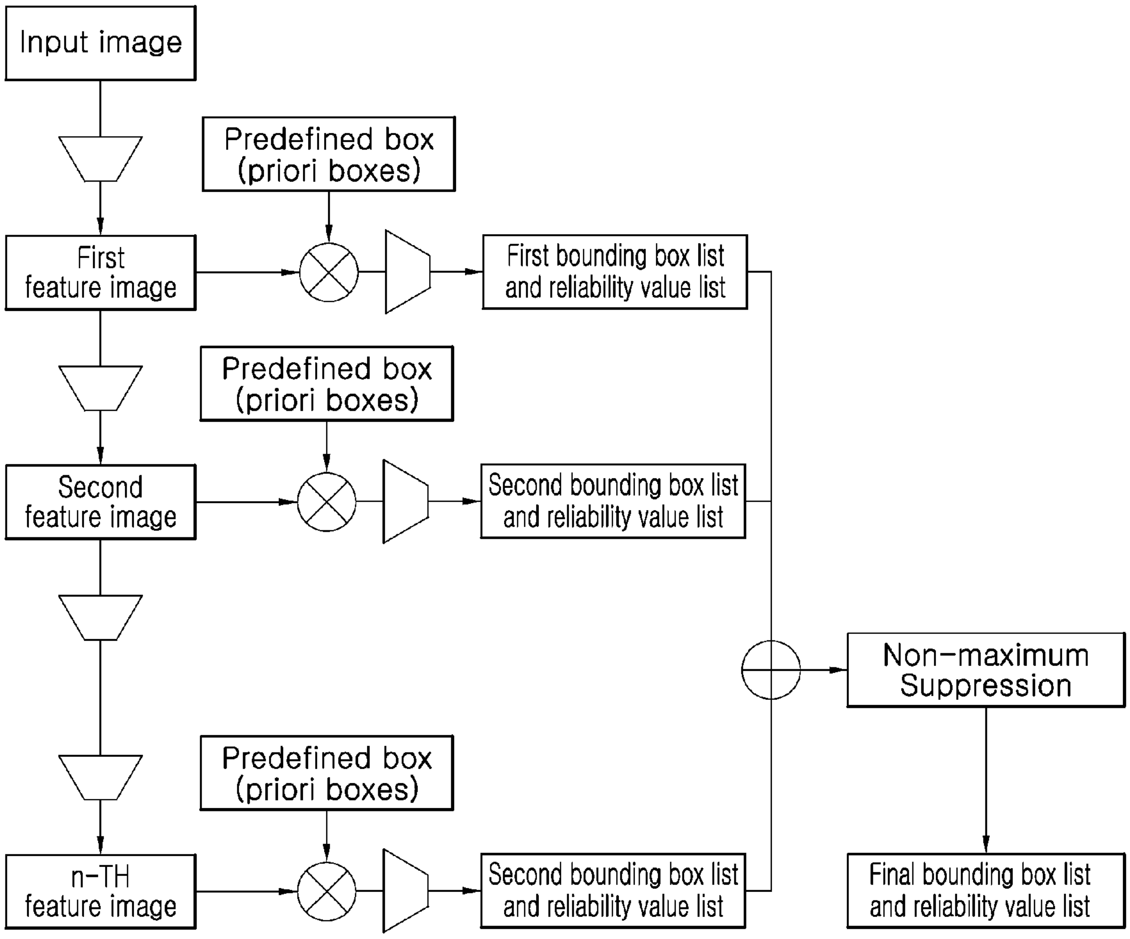
FIG. 6 illustrates a process of setting a feature region according to the present invention.

The result box is finally returned as an object detection result in the image by merging overlapping result boxes through a non-maximum suppression (NMS) step. NMS is a process of obtaining the final feature region from a plurality of feature region candidates. The feature region candidates may be generated in consideration of the probability values shown in Table 1 according to the procedure illustrated in FIG. 6.

A detailed description of this process is as follows.

1. For each species except for the background, the following process is performed.

A. From a bounding box list, a box of which the probability of being the species is lower than a specific threshold value. When there are no remaining box, the step is ended with no results.

B. In the bounding box list, the box with the highest probability of the species is designated as the first box (first bounding region) and excluded from the bounding box list.

C. For the rest of the bounding box list, the following processes are performed in the order of the highest probability.

i. The intersection over union with the first box is computed.

ii. When IOU is higher than a specific threshold value, this box is a box overlapping the first box. Thus, this box is merged with the first box.

D. The first box is added to a result box list.

E. When there are still boxes in the bounding box list, the steps from Step C is repeated again for the remaining boxes.

For two boxes A and B, the intersection over union area ratio can be effectively computed as in Equation 1 below.

$$IoU = \frac{\text{Area}(A \cap B)}{\text{Area}(A \cup B)} = \frac{\text{Area}(A \cap B)}{\text{Area}(A) + \text{Area}(B) - \text{Area}(A \cap B)} \quad \text{[Equation 1]}$$

That is, according to the present invention, the step of generating the feature region candidates includes a step of selecting a first bonding region (first box) with the highest probability of corresponding to a specific animal species in the feature image, and a step of calculating the intersection to union area ratio (IoU) for the remaining bounding regions except for the bounding region (first box) selected in the feature image in order of probability values, and including, as the feature region candidates of the feature image, the bounding region in which the intersection over union area ratio is greater than a reference area ratio.

A method of merging the first box and the overlapping box in the above process will be described as follows. For example, merging may be performed by a method of keeping the first box as it is and deleting the second box from the bounding box list (Hard NMS). Alternatively, merging may be performed by a method in which the first box is kept as it is, and the probability of the second box being a specific species is reduced with being weighted by a value between (0, 1), and, when the attenuated result value is smaller than a specific threshold value, the second box is deleted from the bounding box list (Soft NMS).

As an example proposed by the present invention, as shown in Equation 2 below, a new method (Expansion NMS) of merging the first box (first feature region candidate) and the second box (first feature region candidate) in accordance with the probability value can be used.

$$P^1 = \frac{p^1}{p^1 + p^2} \quad \text{[Equation 2]}$$

$$P^2 = \frac{p^2}{p_1 + p^2}$$

$$C^n_{x,y} = P^1 \cdot C^1_{x,y} + P^2 \cdot C^2_{x,y}$$

$$W^n = P^1 \cdot W^1 + P^2 \cdot W^2$$

$$H^n = P^1 \cdot H^1 + P^2 \cdot H^2$$

In this case, $p^1$ and $p^2$ are the probability values of the first box (first feature region candidate) and the second box (first feature region candidate), respectively, and ${C_{(x,y)}}^1$, ${C_{(x,y)}}^2$, ${C_{(x,y)}}^n$ represent the (x, y) coordinate values of the center points of the first box, the second box, and the merged box, respectively. In the same manner, $W_1$, $W_2$, and $W_n$ represent the horizontal width of the first box, the second box, and the merged box, and $H^1$, $H^2$, $H^n$ represent the vertical height, respectively. As the probability value of the merged box, the probability value of the first box may be used. The first feature region obtained by the extended NMS according to the present invention is determined in consideration of the reliability value at which a specific species is to be located in each of the feature region candidates.

That is, the center point (${C_{(x,y)}}^n$) at which the first feature region is located may be determined by the weighted sum of the reliability values ($p^1$, $p^2$) for the center points (${C_{(x,y)}}^1$, ${C_{(x,y)}}^2$) of the feature region candidates as shown in Equation 2.

In addition, the width ($W_n$) of the first feature region may be determined by the weighted sum of the reliability values ($p^1$, $p^2$) for the widths ($W_1$, $W_2$) of the feature region candidates as in Equation 2, and the height ($H^n$) of the first feature region may be determined by the weighted sum of the reliability values ($p^1$, $p^2$) for the heights ($H^1$, $H^2$) of the feature region candidates.

By creating a new box according to the above example, a box having a greater depth and width is obtained as compared to the known Hard-NMS or Soft-NMS method. According to the present example, a configuration in which a predetermined blank is added in the pre-processing detection for performing the multi-stage detector is possible, and such a blank can be adaptively determined by using the expansion NMS according to the present invention.

Figure 8:
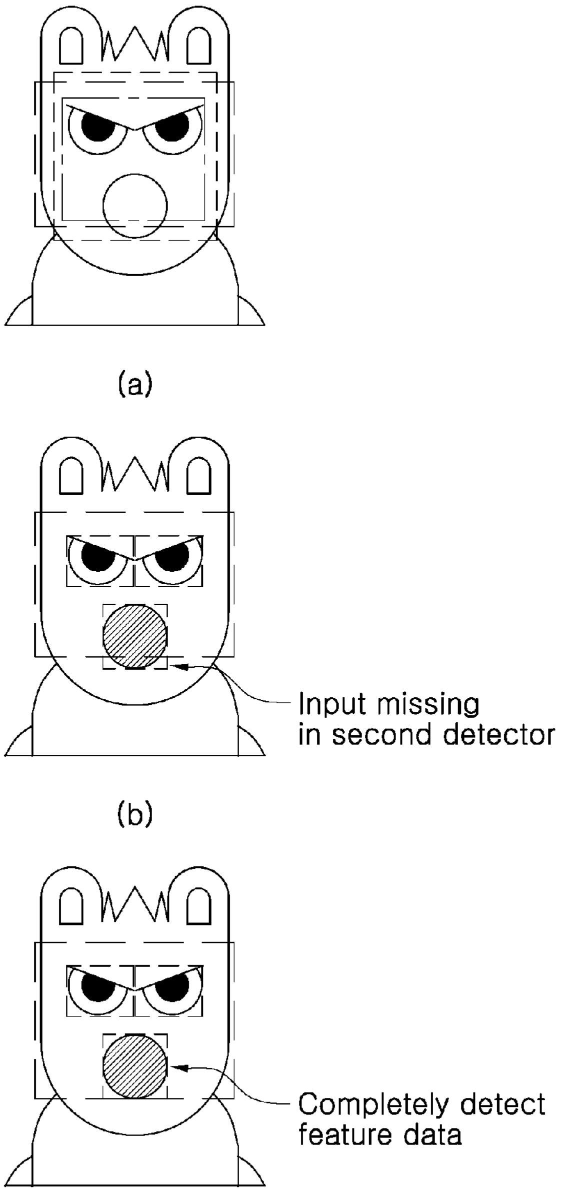
FIG. 8 illustrates a process of obtaining a feature region for determining a species of a companion animal according to the present invention.

FIG. 8 illustrates an example of detecting the feature region of a companion animal by applying the extended NMS according to the present invention as compared to the known NMS. (a) of FIG. 8 illustrates a plurality of feature region candidates generated from the original image. (b) of FIG. 8 illustrates an example of the first feature region obtained by the conventional NMS. (c) of FIG. 8 illustrates an example of the second feature region obtained by applying the extended NMS according to the present invention. As illustrated in (b) of FIG. 8, in the known NMS (Hard NMS, Soft NMS), one box (feature region candidate) with the highest reliability is selected among a plurality of boxes (feature region candidates). Thus, there is a possibility that a region necessary to obtain a noseprint, such as a nose region, deviates in the second feature region detection process performed thereafter.

Thus, in the present invention, a weighted average based on the reliability value may be applied to a plurality of boxes (feature region candidates) to set one box having a large width and height as illustrated in (c) of FIG. 8 as the first feature region (face region of the companion animal) and detect the second feature region (nose region) for identifying the companion animal within the first feature region. By setting a more extended first feature region as in the present invention, it is possible to reduce the occurrence of an error in which the second feature region is not detected, which will be performed later.

Finally, the feature region in the original image can be obtained by performing an inverse transformation process with respect to any transformation process used in the pre-processing step for one or a plurality of bounding boxes determined in this manner. Depending on the configuration, by adding a predetermined amount of blank space to the feature region in the original image, the second detection step, which will be described later, may be adjusted to be well performed.

First Post-Processing Step

The first feature value may be generated by performing an additional post-processing step on each feature region of the input image, which is acquired in the first feature region setting step (S515) described above. For example, in order to acquire brightness information (first feature value) on the first feature region of the input image, an operation as in Equation 3 below may be performed.

$$L_{x,y} = 0.299 \cdot R_{x,y} + 0.587 \cdot G_{x,y} + 0.114 \cdot B_{x,y} \qquad \text{[Equation 3]}$$

$$L = \frac{1}{MN} \sum_{(x,y)\in(M,N)} L_{x,y}$$

$$V_{x,y} = \text{Max}(R_{x,y}, G_{x,y}, B_{x,y})$$

$$V = \frac{1}{MN} \sum_{(x,y)\in(M,N)} V_{x,y}$$

L indicates the Luma value according to the BT.601 standard, and V indicates the brightness value defined in the HSV color space. M and N indicate the horizontal width and vertical height of the target feature region.

By using the first feature value additionally generated, it can be predicted whether the first feature region acquired in the first feature region detection step (S515) is s suitable for use in an application field combined with the present patent. It is obvious that the first feature value additionally generated should be appropriately designed according to an application field. When the condition of the first feature value defined in the application field is not satisfied, a system may be configured to selectively omit the second feature region setting and object detection steps, which will be described later.

Second Feature Region Detection Step

The purpose of this step is to extract a feature region specifically required in the application field from the region where the animal exists. For example, in an application field that detects the positions of eyes, nose, mouth, and ears in the face region of an animal, in the first feature region detection step, the face region of the animal and animal species information are first distinguished, and, the purpose of the second feature region detection step is to detect the positions of the eyes, the nose, the mouth, and the ears according to the animal species.

In this process, the second feature region detection step may be configured by a plurality of independent feature region detectors specialized for the respective animal species. For example, if dogs, cats, and hamsters can be distinguished in the first feature region detection step, it is preferable to design three second feature region detectors to be specialized for dogs, cats, and hamsters. In this manner, it is obvious that it is possible to reduce the learning complexity by reducing the types of features to be learned by the individual feature region detector, and neural network learning is possible even with a smaller number of data in terms of learning data collection.

Since each second feature region detector is configured independent from each other, those skilled in the related art can easily configure an independent individual detector. Preferably, each feature region detector is individually configured to suit the feature information to be detected in each species. Alternatively, in order to reduce the complexity of the system configuration, a method in which some or all of the second feature region detectors share the feature region detectors having the same structure, and the system is configured to be suitable for each species by replacing the learning parameter values may be used. Furthermore, a method of further reducing system complexity in a manner that a feature region detector having the same structure as the first feature region detection step is used as the second feature region detector, and only the learning parameter values and the NMS method are replaced may be considered.

For one or a plurality of feature regions set in the first feature region detection step and the first post-processing step, it is determined which second feature region detector is used, by using the species information detected in the first feature region detection step. Then, the second feature region detection step is performed by using the determined second feature region detector.

First, pre-processing is performed. In this case, it is obvious that a transformation process capable of inverse transformation is to be used in the process of transforming the coordinates. In the second pre-processing process, the first feature region detected in the input image is required to be converted into the input image of the second feature region detector. Thus, it is preferable to define the four points necessary for designing the transformation function as four vertices of the first feature region.

Since the second feature region obtained by the second feature region detector is a value detected using the first feature region, the first feature region is to be considered when the second feature region is computed within the entire input image.

The second feature value may be generated by performing an additional post-processing step similar to the first post-processing step on the second feature region obtained by the second feature region detector. For example, information such as the posture of an animal to be detected may be obtained by applying a Sobel filter to obtain image sharpness, or by using a detection state and a relative positional relationship between the feature regions. In addition, an image quality examination as described later (for example, focus blur and motion blur) may be performed.

By using the additionally generated second feature value, it can be predicted whether the feature region acquired in the second object detection step is suitable for use in an application field combined with the present patent. It is obvious that the additionally generated second feature value is to be appropriately designed according to an application field. When the condition of the second feature value defined in the application field is not satisfied, it is preferable to perform design so that data can be acquired suitable for the application field, such as excluding the first detection region as well as the second detection region from the detection result.

System Expansion

In the present invention, the example of the system and the configuring method in which two detection steps are configured, the position and the species of an animal are detected in a first feature position detection step, and a detector used in a second feature position detection step according to the result is selected.

This cascade configuration can be easily extended to a multi-layer cascade configuration. For example, an application configuration in which the entire body of the animal is detected in the first feature position detection step, the face position and limb position of the animal are detected in the second feature position detection step, and the positions of the eyes, the nose, the mouth, and the ears are detected in a third feature position detection step is possible.

By using such a multi-layer cascading configuration, it is possible to easily design a system capable of simultaneously acquiring feature positions at several layers. It is obvious that, in determining the number of layers in designing a multi-layer cascading system, the hierarchical domain of the feature position to be acquired, the operating time and complexity of the entire system, and the resources required to construct each individual feature region detector are required to be considered and thus the optimum hierarchical structure can be designed.

Figure 7:
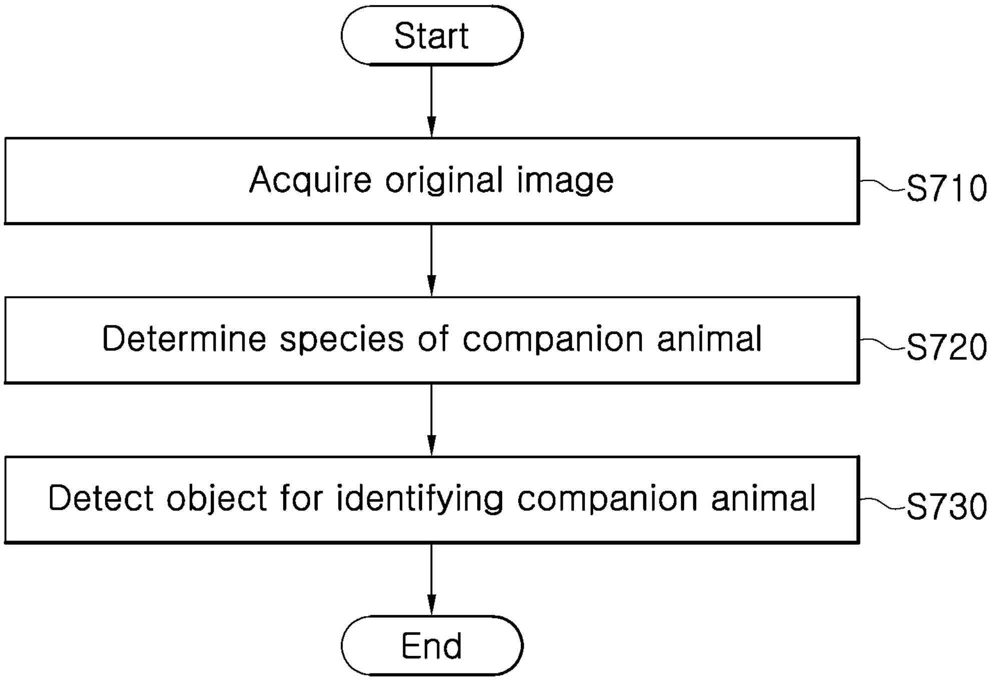
FIG. 7 is a flowchart illustrating a process of detecting an object for identifying a companion animal according to the present invention.

FIG. 7 is a flowchart of a method for detecting an object corresponding to the nose of the companion animal in a noseprint management system of a companion animal according to the present invention.

According to the present invention, a method for detecting an object for identifying a companion animal includes a step of acquiring an original image including the companion animal (for example, a dog) (S710), a step of determining a first feature region and a species of the companion animal by image processing on the original image (S720), and a step of detecting the object (for example, the nose) for identifying the companion animal within the first feature region based on the determined species of the companion animal (S730).

In step S710, an original image including the companion animal is acquired by the camera activated in a state where an application for object recognition of the companion animal is running. Here, illumination, focus, and the like may be adjusted so that the image of the companion animal can be captured smoothly. The image acquired here may be provided as the input image in FIGS. 5 and 6. Then, as described above, for the cascaded object detection, a step of determining the species of the companion animal (S720) and a step of detecting the object of the companion animal (S730) may be performed.

In Step S720, a procedure for identifying the species of the companion animal is performed. According to the present invention, the step of determining the species of the companion animal (S720) may include a step of applying first pre-processing to the original image, a step of determining the species of the companion animal from the pre-processed image and setting the first feature region, and a step of extracting a first feature value by first post-processing on the first feature region.

The step of applying the first pre-processing to the original image is a step of converting the image into a form suitable for object detection by adjusting the size, the ratio, the direction, and the like of the original image, as described with reference to Step S510 in FIG. 5.

The step of setting the first feature region is a step of detecting the region in which the companion animal exists and the species of the companion animal from the image. This step is performed in order to improve the final feature point detection performance by setting the first feature region usable in the second feature region detection step described later and selecting the second feature region detector optimized for the species of the companion animal.

According to the present invention, the step of setting the first feature region may include a step of dividing the pre-processed images into a plurality of feature images by using a learning neural network, a step of applying a bounding box defined in advance to each of the plurality of feature images, a step of calculating a probability value for each type of companion animal within the bounding box, and a step of forming the first feature region to include the bounding box when the calculated probability value for a specific animal species is equal to or greater than a reference value.

As described above, the input image normalized by a pre-processor is hierarchically configured from the first feature image to the n-th feature image by the artificial neural network. In this case, a method of extracting a feature image for each layer may be mechanically learned in a learning step of the artificial neural network.

The hierarchical feature image extracted in this manner may be combined with a list of predefined boxes (priori box) corresponding to each layer to generate a list of bounding boxes, object types, and reliability values (probability values). In addition, the generated list may be finally output in the same format as Table 1.

Then, when the probability value of the specific animal type in the specific bounding box is equal to or greater than the reference value, the first feature region is set so that the corresponding bounding box can be included in the first feature region.

Meanwhile, as described above, the process for determining the face region (first feature region) of the companion animal may be performed at a relatively low resolution because a high resolution is not required. That is, the step of applying the first pre-processing to the original image may include a step of converting the original image into an image having a first resolution lower than an original resolution, and a step of applying the first pre-processing to the image converted to the first resolution.

Meanwhile, when the first feature region for identifying the species of the companion animal is set, the first feature value is extracted by the first post-processing on the first feature region. This is to preferentially determine whether the noseprint image of the dog extracted from the acquired image is suitable as data used for learning or identification.

That is, the object for identifying the companion animal is detected when the first feature value is greater than a reference value, and another image processing is performed without performing additional processing when the first feature value is smaller than the reference value. The first feature value may vary according to each example. For example, brightness information of a processed image may be used.

In Step S730, an object for identifying the companion animal is detected. As an object for identifying a companion animal, various parts such as the eyes, the nose, the mouth, and the ears may be used. The description will be made mainly focusing on the nose for using noseprint. This step is performed in consideration of the species of companion animal performed previously. When the companion animal is a dog, object detection for identification optimized for the dog may be performed. The optimized object detection may vary depending on each animal type. Furthermore, when there are several types of companion animals included in the captured image, object detection for identification may be performed for each animal.

The step of detecting the object for identifying the companion animal may include the step of applying second pre-processing to the first feature region for identifying the species of the companion animal, the step of setting a second feature region for identifying the companion animal based on the species of the companion animal in the first feature region subjected to the second pre-processing, and the step of applying second post-processing to the second feature region.

The second pre-processing for detecting an object for identifying a companion animal is a process of adjusting the size of an image, similar to the first pre-processing. The second pre-processing on the first feature region may be performed at a second resolution higher than the first resolution at which the first pre-processing is applied. Unlike the process of determining the type of animal, the process of detecting the object (for example, nose) for identifying the companion animal and examining identification data (noseprint image) requires a relatively high-quality image. Then, the second feature region is set as the object for identifying a companion animal, in the preprocessed image.

The step of setting the second feature region includes the step of setting the second feature region (for example, nose region) based on a probability that the object (for example, nose) for identifying the companion animal is located in the first feature region (for example, face region) in accordance with the species of the companion animal. When the species of the companion animal is determined in Step S720, the individual feature region detector and the parameter optimized according to the species is selected, and an object (for example, nose region) for identifying the companion animal can be detected.

Post-processing may be performed to examine whether the image of the object for identifying the companion animal, which is detected as the second feature region, is suitable to be used for learning or identification. As a result of the post-processing, the second feature value indicating the fitness of the corresponding image. When the second feature value is greater than the reference value, the image including the second feature region is transmitted to the server.

Figure 13:
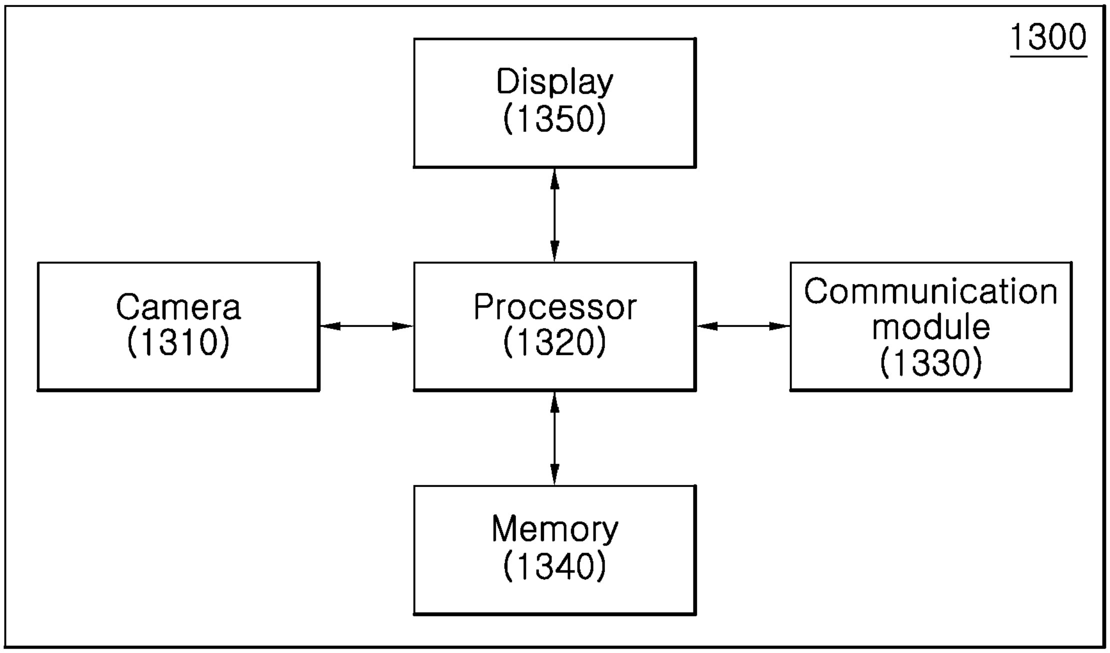
FIG. 13 is a block diagram of an electronic device according to the present invention.

FIG. 13 is a block diagram of an electronic device 1300 according to the present invention. The electronic device 1300 according to the present invention may include a camera 1310, a processor 1320, a communication module 1330, a memory 1340, and a display 1350.

The camera 1310 may include an optical module such as a lens and a charge-coupled device (CCD) or complementary metal-oxide a semiconductor (CMOS) that generates an image signal from input light. The camera 1310 may generate image data by image capturing and provide the processor 1320 with the generated image data.

The processor 1320 controls each module of the electronic device 1300 and performs an operation necessary for image processing. The processor 1320 may be configured by a plurality of microprocessors (processing circuits) depending on the functions. As described above, the processor 1320 may detect an object (for example, nose) for identifying a companion animal (for example, dog) and determine the validity of the image for the object.

The communication module 1330 may transmit or receive data with an external entity via a wired/wireless network. In particular, the communication module 1330 may exchange data for AI-based processing through communication with the server, for learning or identification.

Additionally, the electronic device 1300 may include various modules depending on the purpose, including the memory 1340 that stores image data and information necessary for image processing, and the display 1350 that outputs a screen to a user.

The electronic device 1300 according to the present invention includes the camera 1310 that generates an original image including the companion animal, the processor 1320 that determines a first feature region and a species of the companion animal by image processing on the original image, and detects the object for identifying the companion animal within the first feature region based on the determined species of the companion animal, and the communication module 1330 that transmits an image of the object to a server when the object for identifying the companion animal is valid.

According to the present invention, the processor 1320 may apply first pre-processing to the original image, determine the species of the companion animal from the preprocessed image to set the first feature region, and extract a first feature value by first post-processing on the first feature region.

According to the present invention, the processor 1320 may generate a plurality of feature images from the preprocessed image by using a learning neural network, apply a bounding box defined in advance to each of the plurality of feature images, calculate a probability value for each type of companion animal within the bounding box, and form the first feature region to include the bounding box when the calculated probability value for a specific animal species is equal to or greater than a reference value.

According to the present invention, the object for identifying the companion animal may be detected when the first feature value is greater than a reference value, and additional processing may be omitted when the first feature value is smaller than the reference value.

According to the present invention, the processor 1320 may convert the original image into an image having a first resolution lower than an original resolution, and apply the first pre-processing to the image converted to the first resolution.

According to the present invention, the processor 1320 may apply second pre-processing to the first feature region for identifying the species of the companion animal, set a second feature region for identifying the companion animal based on the species of the companion animal in the first feature region subjected to the second pre-processing, and extract a second feature value by applying second post-processing to the second feature region.

According to the present invention, the second pre-processing on the first feature region may be performed at a second resolution higher than a first resolution at which the first pre-processing for setting the first feature region is applied.

According to the present invention, the processor 1320 may set the second feature region based on a probability that the object for identifying the companion animal is located in the first feature region in accordance with the species of the companion animal.

According to the present invention, when the second feature value is greater than a reference value, an image including the second feature region may be transmitted to the server.

According to the present invention, the processor 1320 may generate feature region candidates for determining the species of the companion animal from the image, and generate the first feature region having a location and a size that are determined based on a reliability value of each of the feature region candidates.

Figure 9:
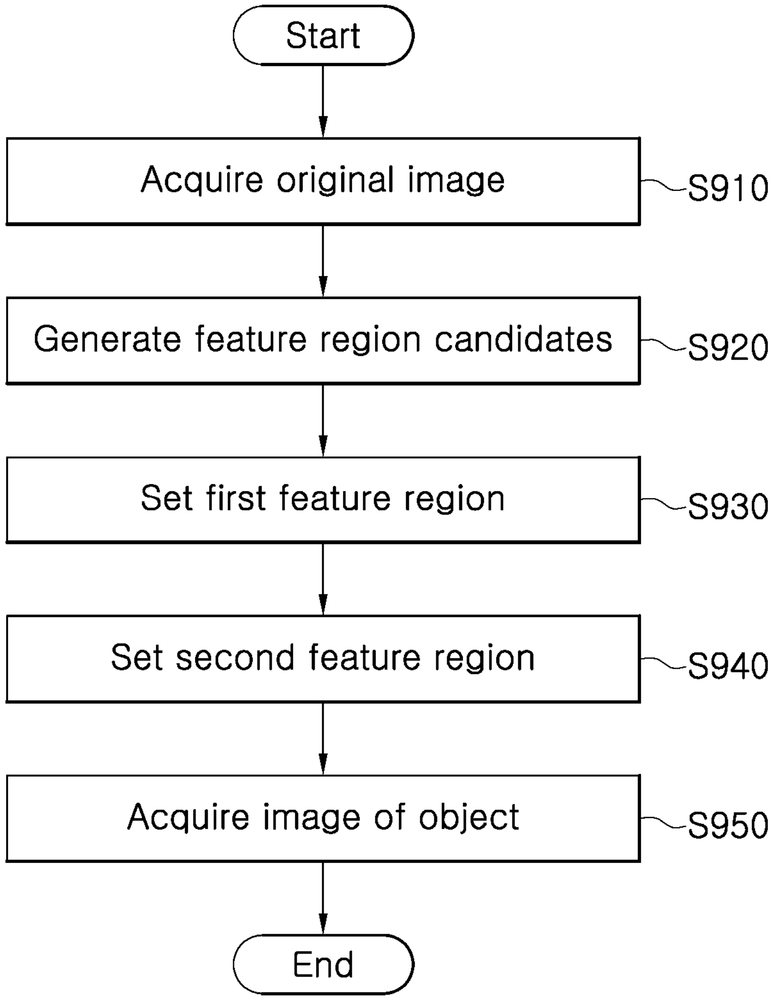
FIG. 9 is a flowchart illustrating a process of processing an image of an object for identifying a companion animal according to the present invention.

FIG. 9 is a flowchart illustrating a method for processing the image of the object for identifying a companion animal.

A method for processing an image of an object for identifying a companion animal according to the present invention includes a step of acquiring an image including a companion animal (S910), a step of generating feature region candidates for determining a species of the companion animal from the image (S920), a step of setting a first feature region having a position and a size that are determined based on the reliability values of each of the feature region candidates (S930), a step of setting a second feature region including the object for identifying the companion animal in the first feature region (S940), and a step of acquiring the image of the object in the second feature region (S950).

According to the present invention, the step of generating the feature region candidates includes a step of hierarchically generating the feature images by using an artificial neural network, a step of calculating a probability value at which the companion animal of a specific species is located in each bounding region by applying predefined boundary regions to each of the feature images, and a step of generating the feature region candidates in consideration of the probability value.

Regarding the input image normalized by the pre-processor, the first feature image to the nth feature image are hierarchically generated by the artificial neural network. A method of extracting the feature image in each layer may be mechanically learned in the learning step of the artificial neural network.

The extracted hierarchical feature image is combined with a list of predefined bounding regions (bounding boxes) corresponding to each layer, and a list of probability values where a specific animal type is located in each bounding region is generated as shown in Table 1. Here, when determination of whether or not the companion animal is a specific animal type is not possible, the object may be defined as the "background".

Then, by applying the extended NMS according to the present invention, candidates (feature region candidates) for the first feature region for identifying a species such as the face of a companion animal in each feature image are generated. Each of the feature region candidates may be obtained by using the probability value for each specific animal species, which has been previously obtained.

According to the present invention, the step of generating the feature region candidates may include a step of selecting a first bonding region with the highest probability of corresponding to a specific animal species in the feature image, and a step of calculating an overlapping degree with the first bounding region for the remaining bounding regions except for the first bounding region selected in the feature image in order of probability values, and including, as the feature region candidates of the feature image, the bounding region in which the overlapping degree is greater than a reference overlapping degree. In this case, in order to evaluate the overlapping degree, for example, the intersection over union area ratio between two bounding regions may be used.

That is, the feature region candidates as illustrated in (a) of FIG. 8 may be generated by the following procedure.

1. For each species except for the background, the following process is performed.

A. From a bounding box list, a box of which the probability of being the species is lower than a specific threshold value. When there are no remaining box, the step is ended with no results.

B. In the bounding box list, the box with the highest probability of the species is designated as the first box (first bounding region) and excluded from the bounding box list.

C. For the rest of the bounding box list, the following processes are performed in the order of the highest probability.

i. The overlapping degree with the first box is computed. For example, the intersection over union may be used.

ii. If the overlapping degree is higher than a specific threshold value, this box is a box overlapping the first box. Thus, this box is merged with the first box.

D. The first box is added to a result box list.

E. When there are still boxes in the bounding box list, the steps from Step C is repeated again for the remaining boxes.

For two boxes A and B, for example, the intersection over union area ratio can be effectively computed as in Equation 1 described above.

As described with reference to FIG. 8, the first feature region (for example, the face region of the companion animal) may be obtained based on the reliability value of each feature region candidate from each of the feature region candidates obtained according to the present invention.

According to the present invention, the center point ($C_{(x,y)}''$) at which the first feature region is located may be determined by the weighted sum of the reliability values ($p^1$, $p^2$) for the center points ($C_{(x,y)}^1$, $C_{(x,y)}^2$) of the feature region candidates as shown in Equation 2.

According to the present invention, the width ($W_n$) of the first feature region may be determined by the weighted sum of the reliability values ($p^1$, $p^2$) for the widths ($W_1$, $W_2$) of the feature region candidates as in Equation 2, and the height ($H''$) of the first feature region may be determined by the weighted sum of the reliability values ($p^1$, $p^2$) for the heights ($H^1$, $H^2$) of the feature region candidates.

In the present invention, a weighted average based on the reliability value may be applied to a plurality of boxes (feature region candidates) to set one box having a large width and height as the first feature region (face region of the companion animal) and detect the second feature region (nose region) for identifying the companion animal within the first feature region. By setting a more extended first feature region as in the present invention, it is possible to reduce the occurrence of an error in which the second feature region is not detected, which will be performed later.

Then, the second feature region (for example, nose region) for identifying the companion animal is detected within the first feature region (for example, the face region of the dog). This step is performed in consideration of the species of companion animal performed previously. When the companion animal is a dog, object detection for identification optimized for the dog may be performed. The optimized object detection may vary depending on each animal type.

The step of setting the second feature region includes the step of setting the second feature region (for example, nose region) based on a probability that the object (for example, nose) for identifying the companion animal is located in the first feature region (for example, face region) in accordance with the species of the companion animal.

In addition, post-processing may be performed to examine whether the image of the object for identifying the companion animal, which is detected as the second feature region, is suitable to be used for learning or identification. As a result of the post-processing, the second feature value indicating the fitness of the corresponding image. When the second feature value is greater than the reference value, the image including the second feature region is transmitted to the server. When the second feature value is smaller than the reference value, the image including the second feature region is discarded.

The electronic device 1300 according to the present invention includes the camera 1310 that generates an image including the companion animal, and the processor 1330 that generates an image of an object for identifying the companion animal by processing the image provided from the camera 1320. The processor 1330 may generate feature region candidates for determining the species of the companion animal in the image, set the first feature region having a position and a size that are determined based on the reliability values of each of the feature region candidates, set the second feature region including the object for identifying the companion animal, and acquire the image of the object in the second feature region.

According to the present invention, the processor 1320 may hierarchically generate a plurality of feature images from the image by using the artificial neural network, calculate the probability value at which the companion animal of a specific species is located in each bounding region by applying predefined boundary regions to each of the feature images, and generate the feature region candidates in consideration of the probability value.

According to the present invention, the processor 1320 may select the first bonding region with the highest probability of corresponding to a specific animal species in the feature image, calculate an overlapping degree with the first bounding region for the remaining bounding regions except for the selected bounding region in the feature image in order of probability values, and include, as the feature region candidates of the feature image, the bounding region in which the overlapping degree is greater than a reference overlapping degree. In this case, the intersection over union area ratio between the two bounding regions may be used to calculate the overlapping degree.

According to the present invention, the center point at which the first feature region is located may be determined by a weighted sum of reliability values for the center points of the feature region candidates.

According to the present invention, the width of the first feature region may be determined by the weighted sum of reliability values for the widths of the feature region candidates, and the height of the first feature region may be determined by the weighted sum of the reliability values for the heights of the feature region candidates.

According to the present invention, the processor 1320 may detect the changed position of the object in the next image, determine whether the image of the object of which the position is changed in the next image is suitable for AI-based learning or identification, and control the camera 1310 to perform the next image capturing in a state where the focus is set to the changed position.

According to the present invention, the processor 1320 may set the first feature region for determining the species of the companion animal in the image, and set the second feature region including an object for identifying the companion animal within the first feature region.

According to the present invention, the processor 1320 may determine whether or not the image of the object for identifying the companion animal is suitable for AI-based learning or identification.

According to the present invention, the processor 1320 may determine whether the quality of the image of the object satisfies the reference condition. When the quality satisfies the reference condition, the processor 1320 may transmit the image of the object to the server. When the quality does not satisfy the reference condition, the processor 1320 may discard the image of the object and control the camera 1310 to perform the next image capturing.

It is examined whether the image (for example, noseprint image) of the object obtained by the above-described processes is suitable for AI-based learning or identification. The quality examination of the image may be performed by various quality conditions, which may be defined by a neural network designer. For example, conditions may include a photo of a real dog, a clear noseprint, no foreign matter, an image captured from the front, and a margin of less than a predetermined percentage. Such conditions may be desirable to be able to be quantified and objectified. If an image with poor quality is stored in the neural network, this may lead to a decrease in the overall performance of the neural network. Thus, it may be desirable to filter images having quality lower than the reference in advance. This filtering processing may be performed in the first post-processing step or the second post-processing step described above.

As an example for examining the quality of an image of an object, a method of detecting quality deterioration due to a focus shift and quality deterioration due to camera or object shaking will be described.

A method for filtering an image of an object for identifying a companion animal according to the present invention includes a step of acquiring an image including a companion animal (S1210), a step of determining the species of a companion animal in the image and setting the first feature region (S1220), a step of setting the second feature region including an object for identifying the companion animal in the first feature region in consideration of the determined species of the companion animal (S1230), and a step of determining whether or not the image of the object is suitable for AI-based learning or identification by examining the quality of the image of the object in the second feature region (S1240).

Also, according to the present invention, the post-processing (quality examination) may be performed on the first feature region, and the second feature region detection and suitability determination may be performed only when the image in the first feature region has suitable quality. That is, the step of setting the first feature region may include a step of determining whether the image of the object is suitable for AI-based learning or identification by examining the quality of the image of the object in the first feature region. The second feature region may be set when it is determined that the image of the object in the first feature region is suitable for AI-based learning or identification. When it is determined that the image of the object in the first feature region is not suitable for AI-based learning or identification, the image of the current frame may be discarded and the image of the next frame may be captured.

The quality examination (first post-processing) on the first feature region may be omitted depending on the examples.

That is, the first post-processing process may be omitted and the second feature region may be detected immediately.

The quality examination of the image of the object may be performed by applying a weight different for each position of the first feature region or the second feature region.

In the first post-processing step, the above-described brightness evaluation may be performed as the method for examining the image quality of an object. For example, by performing the above-described computation of Equation 2 on the first feature region, the brightness value according to the BT.601 standard and the value information in the HSV color space may be extracted in units of pixels. When the average value is smaller than a first brightness reference value, the image may be determined to be too dark. When the average value is greater than a second brightness reference value, the image may be determined to be too bright. When the image is too dark or too bright, the subsequent steps such as the second feature region detection may be omitted and the processing may be ended. In addition, determination may be made by assigning a weight to a region determined to be important among the first feature regions.

According to the present invention, the step of determining whether the image of the object is suitable for AI-based learning or identification may include the step of determining defocus blur of the object in the image of the object.

A method for detecting the quality determination (defocus blur) due to defocus is as follows. Defocus blur means the phenomenon that the focus of the camera is out, and thus the intended region (for example, noseprint region) becomes blurred. As a case in which defocus blur occurs, there may be a picture acquired while autofocus adjustment is performed in a mobile phone camera.

In order to determine an image in which the defocus blur has occurred, a high-frequency component (a component having a frequency higher than a specific value) may be extracted and processed from the image. For an image, a high-frequency component is mainly located at a point where brightness and color change rapidly, that is, an object edge in an image, and a low-frequency component is mainly located at a point having similar brightness and color to the surroundings. Therefore, the clearer the image is in focus, the stronger the high-frequency component is distributed in the image. To determine the high-frequency component, for example, a Laplacian operator may be used. The Laplacian operator performs second-order differentiation on the input signal, and can effectively remove the low-frequency component while leaving the high-frequency component of the input signal. Therefore, when the Laplacian operator is used, it is possible to effectively find the object edge in the image, and also to obtain numerically how sharp the edge is.

For example, by applying a convolution operation to an input photo using a 5×5 Laplacian of Gaussian (LOG) kernel as in Equation 4 below, it is possible to obtain the edge position and edge sharpness information in an image.

$$\text{LoG\_kernel} = \begin{matrix} 0 & 0 & 1 & 0 & 0 \\ 0 & 1 & 2 & 1 & 0 \\ 1 & 2 & -16 & 2 & 1 \\ 0 & 1 & 2 & 1 & 0 \\ 0 & 0 & 1 & 0 & 0 \end{matrix} \quad \text{[Equation 4]}$$

For a photo with little defocus blur and sharp edge, the result value obtained by applying the Laplacian operator may be distributed in a range from 0 to a relatively large value. For a photo with large defocus blur and blurred edge, the result value obtained by applying the Laplacian operator may be distributed in a range from 0 to a relatively small value. Therefore, it is possible to grasp the sharpness by modeling the distribution of the result obtained by applying the Laplacian operator.

As an example of such a method, sharpness may be determined by using a variance value of an image as a result of applying the Laplacian operator. Alternatively, through the histogram analysis, various statistical techniques can be used, such as obtaining the decile distribution of the Laplacian value distribution and calculating the distribution ratio of the highest-lowest interval. These methods can be selectively applied according to the field of application to be used.

That is, according to the present invention, the step of determining the degree of defocus on the object may include a step of extracting an image representing the distribution of high-frequency components by applying a Laplacian operator that performs second-order differentiation to the image of the second feature region, and a step of calculating a value representing the defocus of the image of the second feature region from the distribution diagram of the high frequency component.

Even in the nose region, there is a difference in the important degree of sharpness depending on the position. That is, in the case of the central part of the image, the probability of being the central part of the nose is high. The more it moves to the edge of the image, the more likely it is the outer part of the nose or the hair region around the nose. In order to reflect such spatial characteristics, a method of determining the sharpness by dividing an image into predetermined regions and assigning different weights to the respective regions may be considered. For example, a method of dividing the image into 9 pieces or setting an attention region such as drawing an ellipse based on the center of the image, and then multiplying the region by a weight of w greater than 1 may be considered.

That is, according to the present invention, the weight applied to the central portion of the second feature region may be set to be greater than the weight applied to the peripheral portion of the second feature region. By applying a greater weight to the central portion than to the periphery, the image quality examination can be intensively performed on an object for identification, such as the noseprint of a dog.

As the defocus blur score determined by using the Laplacian operator becomes closer to 0, the edge becomes fainter in the image. As the defocus blur score increases, the edge exists stronger in the image. Therefore, when the defocus blur score is greater than a threshold value, the image may be classified as a clear image, otherwise, the image may be determined as a blurred image. Such a threshold value may be determined empirically by using previously collected or adaptively determined by accumulating and observing several input images each time in a camera.

According to the present invention, the step of determining whether the image of the object is suitable for AI-based learning or identification may include the step of determining the degree of shaking object in the image of the object.

A method for detecting quality deterioration (motion blur) due to shaking will be described below. Motion blur means a phenomenon in which an image of an intended region is captured as if the intended region is shaken while the relative position between an image capturing target and the camera is shaken during the exposure time of the camera. In the case of obtaining such a picture, when the exposure time setting of a mobile phone camera is set to be long in an environment with low light intensity, the dog may move during the exposure time of taking one picture or the hand of the user may shake.

Various edge detectors can be used for feature analysis of such images. For example, in the case of the Canny edge detector, it is known as an edge detector that efficiently detects continuous edges.

Figure 10:
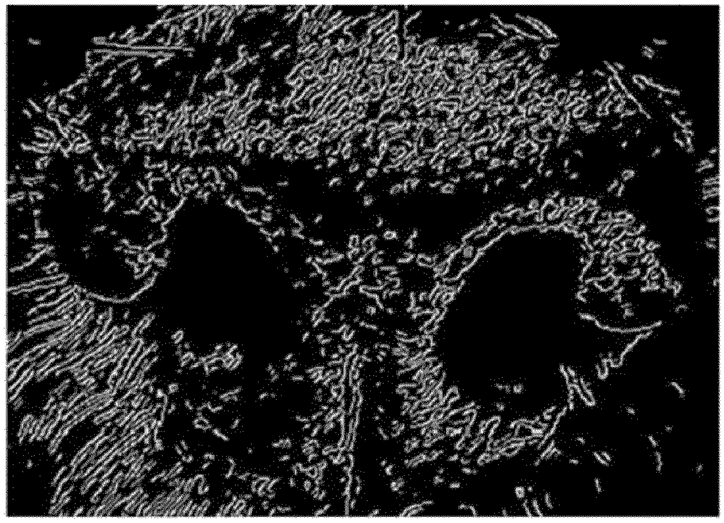
FIG. 10 illustrates an example of a result image obtained by applying a Canny edge detector to an input image.

FIG. 10 illustrates an example of a result image by applying the Canny edge detector to the image in which shake has occurred in an upper diagonal direction of FIG. 10. As illustrated in FIG. 10, as the result of applying the Canny edge detector to the image, it is checked that the edge of the noseprint region is consistently generated in a diagonal (/) direction.

By analyzing the directionality of the edge, it is possible to effectively determine whether there is a shake. As an example of a directional analysis method, the edge detected by the Canny edge detector is always connected to the surrounding pixels. Therefore, it is possible to analyze the directionality by analyzing the connection relationship with the surrounding pixels. According to an example of the present invention, the overall shake direction and the degree can be calculated by analyzing the pattern distribution in a pixel block having a predetermined size, in which the edge is located in the image to which the Canny edge detector is applied.

Figure 11:
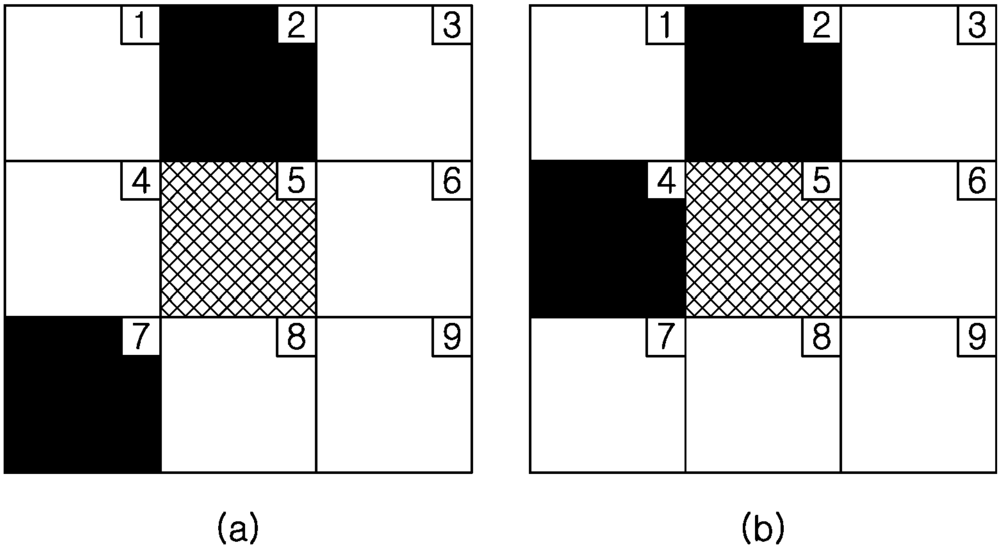
FIG. 11 illustrates an example of a pattern shape of a pixel block in which an edge used to determine whether or not there is shake in an image as a result of applying the Canny edge detector is located.

FIG. 11 illustrates an example of a pattern shape of a pixel block in which a boundary line used to determine whether or not there is shake in an image as a result of applying the Canny edge detector is located.

For example, the case in which 3×3 pixels are detected as an edge as illustrated in (a) of FIG. 11 will be described in detail as an example. For convenient description, as illustrated in FIG. 11, each of the nine pixels is numbered according to positions.

In the case of the central fifth pixel, it may be assumed that the pixel always functions as an edge. If the fifth pixel is not the edge, this 3×3 pixel array is not an edge array, so the processing can be skipped, or it can be counted as a non-edge pixel.

When the central fifth pixel is an edge pixel, the total of 28=256 patterns can be defined based on whether or not the remaining eight surrounding pixels are an edge. For example, the case in (a) of FIG. 11 corresponds to a (01000100) pattern based on whether the pixel {1, 2, 3, 4, 6, 7, 8, 9} is an edge, which is converted into a decimal system, and be called the 68th pattern. Such a naming method may be changed to facilitate implementation situations.

When the pattern is defined in this manner, the start point, the end point, and the direction of the edge can be defined according to the arrangement of the pattern. For example, the 68th pattern may be defined that the boundary starts at the lower left end (No. 7) and ends at the upper end (No. 2). Based on this, the corresponding pattern can be defined as a {diagonal top right (↗) direction, steep angle} pattern.

The pattern in (b) of FIG. 11 is analyzed in the similar manner, and the result is as follows. The corresponding pattern is a (01010000) pattern, which can be called the 80th pattern. Since the boundary starts at the left (No. 4) and ends at the top (No. 2), the pattern can be defined as a {diagonal top right (↗) direction, middle angle} pattern.

In this manner, a lookup table for 256 patterns can be created. In this case, the available combinations can be defined, for example, in eight directions as follows.

Vertical (↑)

Diagonal top right (↗) {steep, medium, shallow} angle

Horizontal (→)

Diagonal Bottom Right (↘) {shallow, medium, steep} angle

Based on this method, it is possible to create directional statistical information of boundary pixels in the resulting image of the Canny edge detector. Based on such statistical information, it is possible to effectively determine whether the corresponding image has motion blur. It is self-evident that such a criterion can be determined based on a large amount of data by designing a classification method empirically or by using a machine learning method. As such a method, for example, a method such as a decision tree or a random forest may be used, or a classifier using a deep neural network may be designed.

That is, according to the present: invention, the step of determining the degree of shaking of the object may include a step of applying a Canny edge detector to the image of the second feature region as illustrated in FIG. 10 to construct an edge image constituting an edge image, a step of analyzing the distribution of the direction pattern of blocks including the edge in the edge image as illustrated in FIG. 10, and a step of calculating a value indicating the degree of shaking of the object from the distribution of the direction pattern.

In preparing the above-described statistical information, it is obvious that the nose region has more important information than the surrounding area. Therefore, it is possible to use a method such as separately collecting statistical information in a predetermined region in the image and assigning a weight. As an example of such a method, the method used for defocus blur determination by using the above-described Laplacian operator may be used. That is, the step of calculating the value indicating the degree of shaking of the object from the distribution of the direction pattern may include a step of calculating the distribution degree of the direction pattern by applying a weight to each block in the second feature region. The weight of the block located at the center of the second feature region may be set to be greater than the weight of the block located on the periphery of the second feature region.

Figure 12:
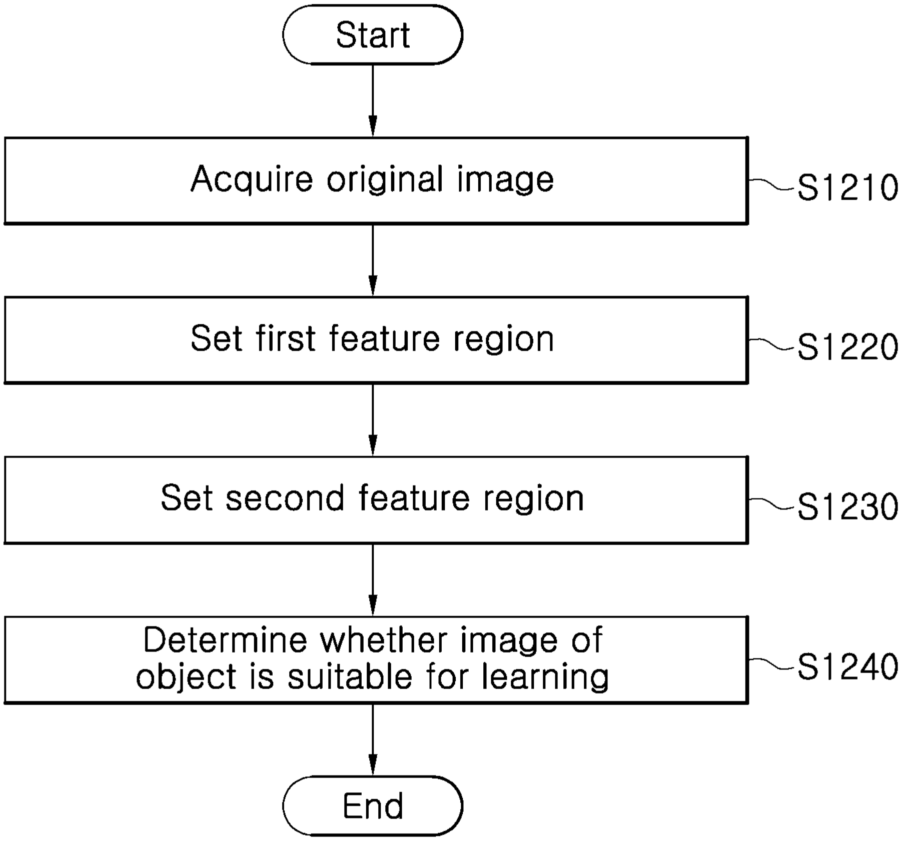
FIG. 12 is a flowchart illustrating a method for filtering the image of the object for identifying a companion animal.

FIG. 12 is a flowchart illustrating a method for filtering the image of the object for identifying a companion animal. A method for filtering an image of an object for identifying a companion animal according to the present invention includes a step of acquiring an image including a companion animal (S1210), a step of determining the species of a companion animal in the image and setting the first feature region (S1220), a step of setting the second feature region including an object for identifying the companion animal in the first feature region in consideration of the determined species of the companion animal (S1230), and a step of determining whether or not the image of the object is suitable for AI-based learning or identification by examining the quality of the image of the object in the second feature region (S1240). The quality examination of the image of the object may be performed by applying a weight different for each position of the first feature region or the second feature region.

Meanwhile, after the step of setting the first feature region (S1220), a step of determining whether the image of the object is suitable for AI-based learning or identification by examining the quality of the image of the object in the first specific region (S1230) may be performed. In this case, the second feature region may be set when it is determined that the image of the object in the first feature region is suitable for AI-based learning or identification. The quality examination (first post-processing) on the first feature region may be omitted depending on the examples.

The step of determining whether the image of the object is suitable for artificial intelligence-based learning or identification by examining the quality of the image of the object in the first feature region may include a step of determining whether the brightness in the first feature region belongs to a reference range. This step may include a step of extracting Luma information and HSV color space brightness information based on the BT.601 standard from the first feature region, and determining whether the average value is between the first threshold value and the second threshold value. In calculating the average value in this step, different weights may be applied depending on the position in the image.

According to the present invention, the step of determining whether the image of the object is suitable for AI-based learning or identification may include the step of determining defocus blur of the object in the image of the object.

According to the present invention, the step of determining the degree of defocus on the object may include a step of extracting an image representing the distribution of high-frequency components by applying a Laplacian operator that performs second-order differentiation to the image of the second feature region, and a step of calculating a value representing the defocus of the image of the second feature region from the distribution diagram of the high frequency component.

According to the present invention, the weight applied to the central portion of the first feature region or the second feature region may be set to be greater than the weight applied to the peripheral portion of the first feature region or the second feature region.

According to the present invention, the step of determining whether the image of the object is suitable for AI-based learning or identification may include the step of determining the degree of shaking object in the image of the object.

According to the present invention, the step of determining the degree of shaking of the object may include a step of applying a Canny edge detector to the image of the second feature region to construct an edge image constituting an edge image, a step of analyzing the distribution of the direction pattern of blocks including the edge in the same edge image, and a step of calculating a value indicating the degree of shaking of the object from the distribution of the direction pattern.

According to the present invention, the step of calculating the value indicating the degree of shaking of the object from the distribution of the direction pattern may include a step of calculating the distribution degree of the direction pattern by applying a weight to each block in the second feature region. The weight of the block located at the center of the second feature region may be set to be greater than the weight of the block located on the periphery of the second feature region.

The electronic device 1300 according to the present invention includes the camera 1310 that generates an image including the companion animal, and the processor 1320 that generates an image of an object for identifying the companion animal by processing the image provided from the camera 1310. The processor 1320 sets the first feature region for determining the species of the companion animal in the image, and sets the second feature region including the object for identifying the companion animal in the first feature region in consideration of the determined species of the companion animal. In addition, it is set to be determined whether the image of the object is suitable for artificial intelligence-based learning or identification, by examining the quality of the image of the object in the second feature region.

According to the present invention, the processor 1310 may determine whether the image of the object is suitable for AI-based learning or identification by examining the quality of the image of the object in the first feature region. Here, the second feature region detection and quality examination may be performed only when the image of the object in the first feature region is suitable for AI-based learning or identification.

According to the present invention, the processor 1310 may determine whether the brightness in the first feature region belongs to the reference range. The quality examination (first post-processing) on the first feature region may be omitted depending on the examples.

Here, the quality examination of the image of the object may be performed by applying a weight different for each position of the first feature region or the second feature region.

According to the present invention, the processor 1310 may determine the degree of defocus of the object in the image of the object.

According to the present invention, the processor 1310 may extract an image representing the distribution of the high frequency component from the image of the second feature region, and calculate a value representing the defocus of the image in the second feature region from the distribution of the high frequency component.

According to the present invention, the weight applied to the central portion of the first feature region or the second feature region may be set to be greater than the weight applied to the peripheral portion of the first feature region or the second feature region.

According to the present invention, the processor 1310 may determine the degree of shaking of the object in the image of the object.

According to the present invention, the processor 1310 may construct an edge image constituted by an edge of the image of the second feature region, analyze the distribution of the direction pattern of blocks including the edges in the edge image, and calculate the value representing the degree of shaking of the object from the distribution of the direction pattern.

According to the present invention, the processor 1310 may calculate the distribution degree of the direction pattern by applying a weight to each block of the second feature region, and set the weight of the block located in the center of the second feature region to be greater than the weight of the block located in the periphery of the second feature region.

It will be apparent that the present embodiment and the drawings attached to this specification just clearly represent a part of the technical spirit included in the present invention, and all modification examples and specific embodiments that can be easily inferred by those skilled in the art within the scope of the technical spirit contained in the specification and drawings of the present invention are included in the scope of the present invention.

Therefore, the spirit of the present invention should not be limited to the described embodiments, and not only the claims to be described later, but also all those that have equal or equivalent modifications to the claims will be said to belong to the scope of the spirit of the present invention.

The invention claimed is:

1. A method for detecting an object for identifying a companion animal, the method comprising:

acquiring an original image including the companion animal;

determining a first feature region corresponding to a face region of the companion animal and a species of the companion animal by image processing on the original image in a first processing stage; and detecting an object for identifying the companion animal by setting a second feature region within the first feature region based on the determined species of the companion animal in a second processing stage that is executed subsequent to and conditioned upon the species of the companion animal determined in the first processing stage, wherein the first processing stage and the second processing stage form a cascaded detection architecture, wherein detecting the object for identifying the companion animal comprises:

selecting a detector corresponding to the determined species of the companion animal, among a plurality of detectors that are specialized for respective animal species and independent of each other; and setting the second feature region within the first feature region by using the selected detector, wherein each of the plurality of detectors is an algorithm for detecting objects having various sizes with respect to one image in an artificial neural network, and wherein the selected detector corresponding to the determined species is executed in the second processing stage while detectors other than the selected detector are not executed.

2. The method according to claim 1, wherein determining the species of the companion animal comprises:

applying first pre-processing to the original image;

determining the species of the companion animal from the pre-processed image and setting the first feature region; and extracting a first feature value by first post-processing on the first feature region.

3. The method according to claim 2, wherein setting the first feature region comprises:

generating a plurality of feature images from the pre-processed image by using a learning neural network;

applying a bounding box defined in advance to each of the plurality of feature images;

calculating a probability value for each type of companion animal within the bounding box; and forming the first feature region to include the bounding box when the calculated probability value for a specific animal species is equal to or greater than a reference value.

4. The method according to claim 2, wherein the object for identifying the companion animal is detected when the first feature value is greater than a reference value, and additional processing is omitted when the first feature value is smaller than the reference value.

5. The method according to claim 2, wherein applying the first pre-processing to the original image comprises:

converting the original image into an image having a first resolution lower than an original resolution; and applying the first pre-processing to the image converted to the first resolution.

6. The method according to claim 1, wherein detecting the object for identifying the companion animal comprises:

applying second pre-processing to the first feature region for identifying the species of the companion animal;

setting the second feature region for identifying the companion animal based on the species of the companion animal in the first feature region subjected to the second pre-processing; and extracting a second feature value by applying second post-processing to the second feature region.

7. The method according to claim 6, wherein the second pre-processing on the first feature region is performed at a second resolution higher than a first resolution at which the first pre-processing for setting the first feature region is applied.

8. The method according to claim 6, wherein setting the second feature region comprises setting the second feature region based on a probability that the object for identifying the companion animal is located in the first feature region in accordance with the species of the companion animal.

9. The method according to claim 6, wherein when the second feature value is greater than a reference value, an image including the second feature region is transmitted to a server.

10. The method according to claim 1, wherein determining the first feature region comprises:

generating feature region candidates for determining the species of the companion animal from the original image; and generating the first feature region having a location and a size that are determined based on a reliability value of each of the feature region candidates.

11. An electronic device that detects an object for identifying a companion animal, the electronic device comprising:

a camera configured to generate an original image including the companion animal;

a processor configured to:

determine a first feature region corresponding to a face region of the companion animal and a species of the companion animal by image processing on the original image in a first processing stage; and detect the object for identifying the companion animal by setting a second feature region within the first feature region based on the determined species of the companion animal in a second processing stage that is executed subsequent to and conditioned upon the species of the companion animal determined in the first processing stage, wherein the first processing stage and the second processing stage form a cascaded detection architecture; and a communication module configured to transmit an image of the object to a server when the object for identifying the companion animal is valid, wherein the processor is configured to:

select a detector corresponding to the determined species of the companion animal, among a plurality of detectors that are specialized for respective animal species and independent of each other; and set the second feature region within the first feature region by using the selected detector, wherein each of the plurality of detectors is an algorithm for detecting objects having various sizes with respect to one image in an artificial neural network, and wherein the selected detector corresponding to the determined species is executed in the second processing stage while detectors other than the selected detector are not executed.

12. The electronic device according to claim 11, wherein the processor is configured to:

apply first pre-processing to the original image;
determine the species of the companion animal from the pre-processed image to set the first feature region; and
extract a first feature value by first post-processing on the first feature region.

13. The electronic device according to claim 12, wherein the processor is configured to:
generate a plurality of feature images from the pre-processed image by using a learning neural network;
apply a bounding box defined in advance to each of the plurality of feature images;
calculate a probability value for each type of companion animal within the bounding box; and
form the first feature region to include the bounding box when the calculated probability value for a specific animal species is equal to or greater than a reference value.

14. The electronic device according to claim 12, wherein the object for identifying the companion animal is detected when the first feature value is greater than a reference value, and additional processing is omitted when the first feature value is smaller than the reference value.

15. The electronic device according to claim 12, wherein the processor is configured to:
convert the original image into an image having a first resolution lower than an original resolution; and
apply the first pre-processing to the image converted to the first resolution.

16. The electronic device according to claim 11, wherein the processor is configured to:
apply second pre-processing to the first feature region for identifying the species of the companion animal;
set the second feature region for identifying the companion animal based on the species of the companion animal in the first feature region subjected to the second pre-processing; and
extract a second feature value by applying second post-processing to the second feature region.

17. The electronic device according to claim 16, wherein the second pre-processing on the first feature region is performed at a second resolution higher than a first resolution at which the first pre-processing for setting the first feature region is applied.

18. The electronic device according to claim 16, wherein the processor is configured to set the second feature region based on a probability that the object for identifying the companion animal is located in the first feature region in accordance with the species of the companion animal.

19. The electronic device according to claim 16, wherein when the second feature value is greater than a reference value, an image including the second feature region is transmitted to the server.

20. The electronic device according to claim 11, wherein the processor is configured to:
generate feature region candidates for determining the species of the companion animal from the image; and
generate the first feature region having a location and a size that are determined based on a reliability value of each of the feature region candidates.

* * * * *